United States Patent
Muratani

(10) Patent No.: US 7,346,777 B2
(45) Date of Patent: *Mar. 18, 2008

(54) IDENTIFICATION INFORMATION EMBEDDING APPARATUS AND IDENTIFICATION INFORMATION ANALYSIS APPARATUS

(75) Inventor: Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 823 days.

This patent is subject to a terminal disclaimer.

(21) Appl. No.: 10/351,477

(22) Filed: Jan. 27, 2003

(65) Prior Publication Data

US 2003/0188168 A1 Oct. 2, 2003

(30) Foreign Application Priority Data

Jan. 28, 2002 (JP) .............................. 2002-019133

(51) Int. Cl.
*H04L 9/00* (2006.01)
*G06F 7/04* (2006.01)

(52) U.S. Cl. ........................................ 713/176; 726/26
(58) Field of Classification Search ............ 726/31–33, 726/26; 713/176
See application file for complete search history.

(56) References Cited

U.S. PATENT DOCUMENTS

| 6,430,301 | B1 * | 8/2002 | Petrovic ..................... 382/100 |
| 6,901,515 | B1 * | 5/2005 | Muratani .................... 713/176 |
| 2003/0009671 | A1 * | 1/2003 | Yacobi et al. ............... 713/176 |
| 2003/0026422 | A1 * | 2/2003 | Gerheim et al. ............ 380/210 |

FOREIGN PATENT DOCUMENTS

| JP | 2000-3129 | 1/2000 |
| JP | 2000-003129 | * 1/2000 |

OTHER PUBLICATIONS

Su et al, "A Content-Dependent Spatially Localized Video Watermark For Resistance to Collusion And Interpolation Attacks" IEEE, pp. 818-821.*
Hel-Or et al, "Geometric Hashing Techniques For Watermarking" IEEE, pp. 498-501.*
Dan Boneh, et al. "Collusion-Secure Fingerprinting for Digital Data," Department of Computer Science, Princeton University, 1995, pp. 452-465.
Hirofumi Muratani, "A Collusion-Secure Fingerprinting Code Reduced by Chinese Remaindering and its Random-Error Resilience," IH 2001, LNCS 2137, 2001, pp. 303-315.
U.S. Appl. No. 10/351,477, filed Jan. 27, 2003, Muratani.
U.S. Appl. No. 10/648,522, filed Aug. 27, 2003, Muratani.

* cited by examiner

*Primary Examiner*—Kambiz Zand
*Assistant Examiner*—Christopher J Brown
(74) *Attorney, Agent, or Firm*—Oblon, Spivak, McClelland, Maier & Neustadt, P.C.

(57) ABSTRACT

An identification information apparatus detects first and second boundary position information representing boundary positions on a high-order bit side and a low-order bit side of codes formed of components, extracts a colluder group matching with a set of the first and second boundary position information among colluder groups including combinations of an arbitrary number of identification information which is not more than a predetermined maximum number, and detects identification information which is common to a plurality of the colluder groups.

23 Claims, 23 Drawing Sheets

| USER ID | COMPONENT CODE | | | | | | | | | |
|---|---|---|---|---|---|---|---|---|---|---|
| | B(0) | B(1) | ... | B(Smin) | ... | B(Smax) | ... | B(n-3) | B(n-2) |
| 0 | 1...1 | 1...1 | 1...1 | 1...1 | 1...1 | 1...1 | 1...1 | 1...1 | 1...1 |
| 1 | 0...0 | 1...1 | 1...1 | 1...1 | 1...1 | 1...1 | 1...1 | 1...1 | 1...1 |
| ... | 0...0 | 0...0 | 0...0 | 1...1 | 1...1 | 1...1 | 1...1 | 1...1 | 1...1 |
| Smin | 0...0 | 0...0 | 0...0 | 0...0 | 0...0 | 1...1 | 1...1 | 1...1 | 1...1 |
| ... | 0...0 | 0...0 | 0...0 | 0...0 | 0...0 | 0...0 | 1...1 | 1...1 | 1...1 |
| Smax | 0...0 | 0...0 | 0...0 | 0...0 | 0...0 | 0...0 | 0...0 | 1...1 | 1...1 |
| ... | 0...0 | 0...0 | 0...0 | 0...0 | 0...0 | 0...0 | 0...0 | 0...0 | 1...1 |
| n-2 | 0...0 | 0...0 | 0...0 | 0...0 | 0...0 | 0...0 | 0...0 | 0...0 | 1...1 |
| n-1 | 0...0 | 0...0 | 0...0 | 0...0 | 0...0 | 0...0 | 0...0 | 0...0 | 0...0 |

FIG. 7

|  | USER ID | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| A(1) | 0 | 1 | 2 | 0 | 1 | 2 | 0 | 1 | 2 | 0 | 1 | 2 | 0 | 1 | 2 |
| A(2) | 0 | 1 | 2 | 3 | 4 | 0 | 1 | 2 | 3 | 4 | 0 | 1 | 2 | 3 | 4 |
| A(3) | 0 | 1 | 2 | 3 | 4 | 5 | 6 | 0 | 1 | 2 | 3 | 4 | 5 | 6 | 0 |

FIG. 8

| ID | CODES (W(1)+W(2)+W(3)) CORRESPONDING TO USER IDS | | |
|---|---|---|---|
| 0 | 111111 | 111111111111 | 111111111111111111 |
| 1 | 000111 | 000111111111 | 000111111111111111 |
| 2 | 000000 | 000000111111 | 000000111111111111 |
| 3 | 111111 | 000000000111 | 000000000111111111 |
| 4 | 000111 | 000000000000 | 000000000000111111 |
| 5 | 000000 | 111111111111 | 000000000000000111 |
| 6 | 111111 | 000111111111 | 000000000000000000 |
| 7 | 000111 | 000000111111 | 111111111111111111 |
| 8 | 000000 | 000000000111 | 000111111111111111 |
| 9 | 111111 | 000000000000 | 000000111111111111 |
| 10 | 000111 | 111111111111 | 000000000111111111 |
| 11 | 000000 | 000111111111 | 000000000000111111 |
| 12 | 111111 | 000000111111 | 000000000000000111 |
| 13 | 000111 | 000000000111 | 000000000000000000 |
| 14 | 000000 | 000000000000 | 111111111111111111 |

| CODE | B(0) | B(1) | B(2) | ... | B(N-3) | B(N-2) | |
|---|---|---|---|---|---|---|---|
| Amin → 0 | 1 | 2 | 3 | | N-3 | N-2 | N-1 |
| 0 | 1 | 2 | 3 | | N-3 | N-2 | N-1 ← Amax |

FIG. 10B

| CODE | 000 | 000 | 101 | 011 | 111 | 111 | ... | 111 | |
|---|---|---|---|---|---|---|---|---|---|
| Amin → 0 | 1 | 2 | 3 | 4 | 5 | 6 | | N-2 | N-1 |
| 0 | 1 | 2 | 3 | 4 | 5 | 6 | | N-2 | N-1 ← Amax |

FIG. 10C

| CODE | 000 | 000 | 111 | 111 | 111 | 111 | ... | 111 | |
|---|---|---|---|---|---|---|---|---|---|
| Amin → 0 | 1 | 2 | 3 | 4 | 5 | 6 | | N-2 | N-1 |
| 0 | 1 | 2 | 3 | 4 | 5 | 6 | | N-2 | N-1 ← Amax |

FIG. 10D

| CODE | 000 | 000 | 000 | 000 | 111 | 111 | ... | 111 | |
|---|---|---|---|---|---|---|---|---|---|
| Amin → 0 | 1 | 2 | 3 | 4 | 5 | 6 | | N-2 | N-1 |
| 0 | 1 | 2 | 3 | 4 | 5 | 6 | | N-2 | N-1 ← Amax |

| ID | 0 | 1 | 2 | 3 | 4 | 5 |
|---|---|---|---|---|---|---|
| $r(0)_1 = \text{ID mod } 2$ | 0 | 1 | 0 | 1 | 0 | 1 |
| $r(0)_2 = \text{ID mod } 3$ | 0 | 1 | 2 | 0 | 1 | 2 |
| $r(0)_3 = \text{ID mod } 5$ | 0 | 1 | 2 | 3 | 4 | 0 |
| $r(0)_4 = \text{ID mod } 7$ | 0 | 1 | 2 | 3 | 4 | 5 |

FIG. 16

| $r(-)_1$ | 0 | $r(+)_1$ | 1 |
|---|---|---|---|
| $r(-)_2$ | 0 | $r(+)_2$ | 2 |
| $r(-)_3$ | 2 | $r(+)_3$ | 3 |
| $r(-)_4$ | 2 | $r(+)_4$ | 3 |

FIG. 17A

⇕ MATCH

COLLUDER GROUP BASED ON ID=2 AND ID=3

| ID | 2 | 3 |
|---|---|---|
| $r(0)_1 = \text{ID mod } 2$ | ⓪ | ☐1 |
| $r(0)_2 = \text{ID mod } 3$ | ☐2 | ⓪ |
| $r(0)_3 = \text{ID mod } 5$ | ②  | ☐3 |
| $r(0)_4 = \text{ID mod } 7$ | ② | ☐3 |

| $r(-)_1$ | 0 | $r(+)_1$ | 1 |
| $r(-)_2$ | 0 | $r(+)_2$ | 2 |
| $r(-)_3$ | 0 | $r(+)_3$ | 3 |
| $r(-)_4$ | 2 | $r(+)_4$ | 5 |

↕ MATCH

COLLUDER GROUP BASED ON ID=2, ID=3 AND ID=4

| ID | 2 | 3 | 5 |
|---|---|---|---|
| $r(0)_1 = $ ID mod 2 | (0) | [1] | 1 |
| $r(0)_2 = $ ID mod 3 | 2 | (0) | [2] |
| $r(0)_3 = $ ID mod 5 | 2 | [3] | (0) |
| $r(0)_4 = $ ID mod 7 | (2) | 3 | [5] |

| | | | |
|---|---|---|---|
| $r(-)_1$ | 0 | $r(+)_1$ | 1 |
| $r(-)_2$ | 0 | $r(+)_2$ | 1 |
| $r(-)_3$ | 0 | $r(+)_3$ | 4 |
| $r(-)_4$ | 0 | $r(+)_4$ | 4 |

⇅ MATCH

1 : COLLUDER GROUP BASED ON ID=0, ID=1 AND ID=4

FIG. 19B

| ID | 0 | 1 | 4 |
|---|---|---|---|
| $r(0)_1$=ID mod 2 | (0) | [1] | 0 |
| $r(0)_2$=ID mod 3 | (0) | [1] | 1 |
| $r(0)_3$=ID mod 5 | (0) | 1 | [4] |
| $r(0)_4$=ID mod 7 | (0) | 1 | [4] |

2 : COLLUDER GROUP BASED ON ID=0, ID=3 AND ID=4

FIG. 19C

| ID | 0 | 3 | 4 |
|---|---|---|---|
| $r(0)_1$=ID mod 2 | (0) | [1] | 0 |
| $r(0)_2$=ID mod 3 | (0) | 0 | [1] |
| $r(0)_3$=ID mod 5 | (0) | 3 | [4] |
| $r(0)_4$=ID mod 7 | (0) | 3 | [4] |

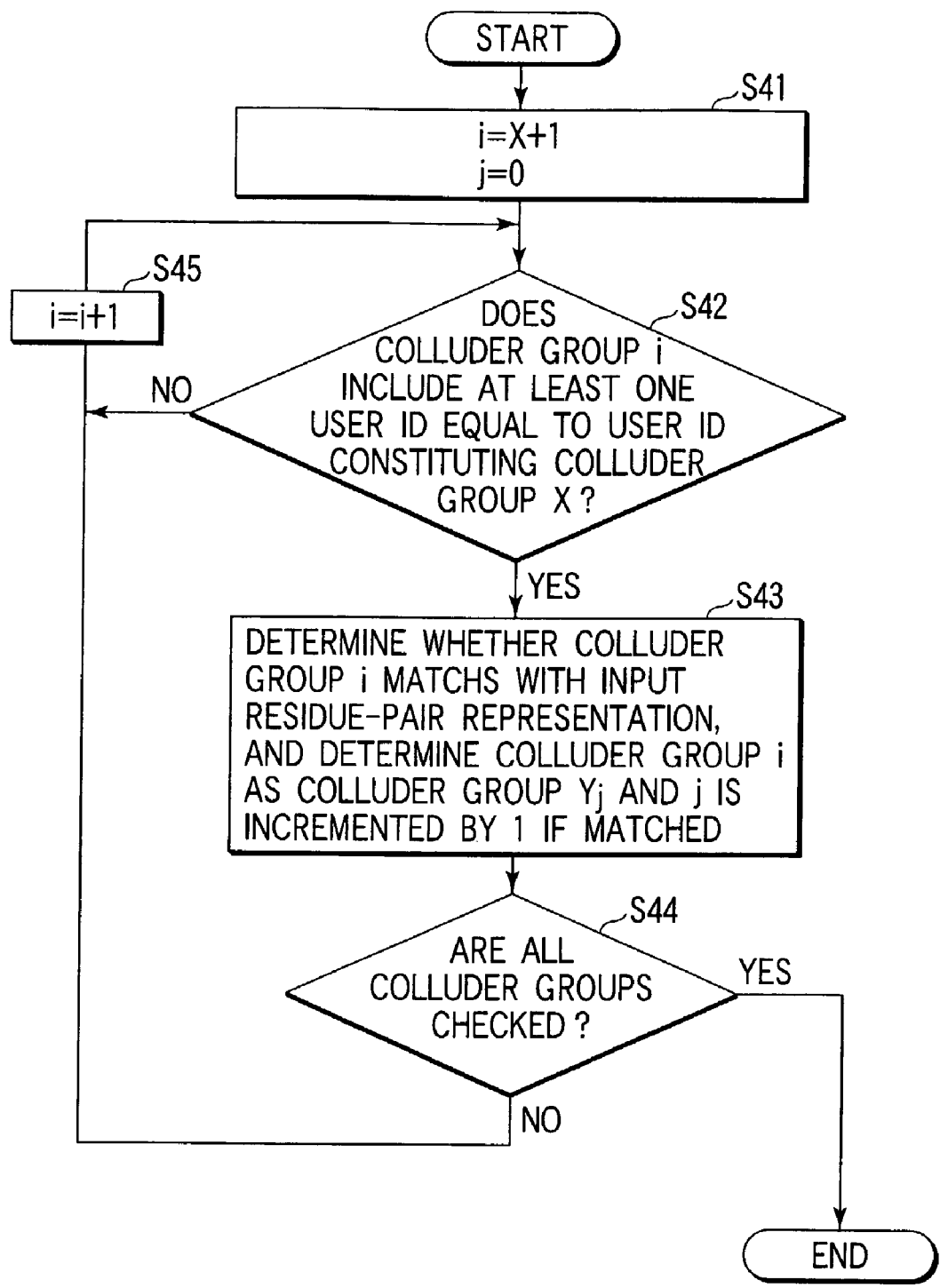
F I G. 24

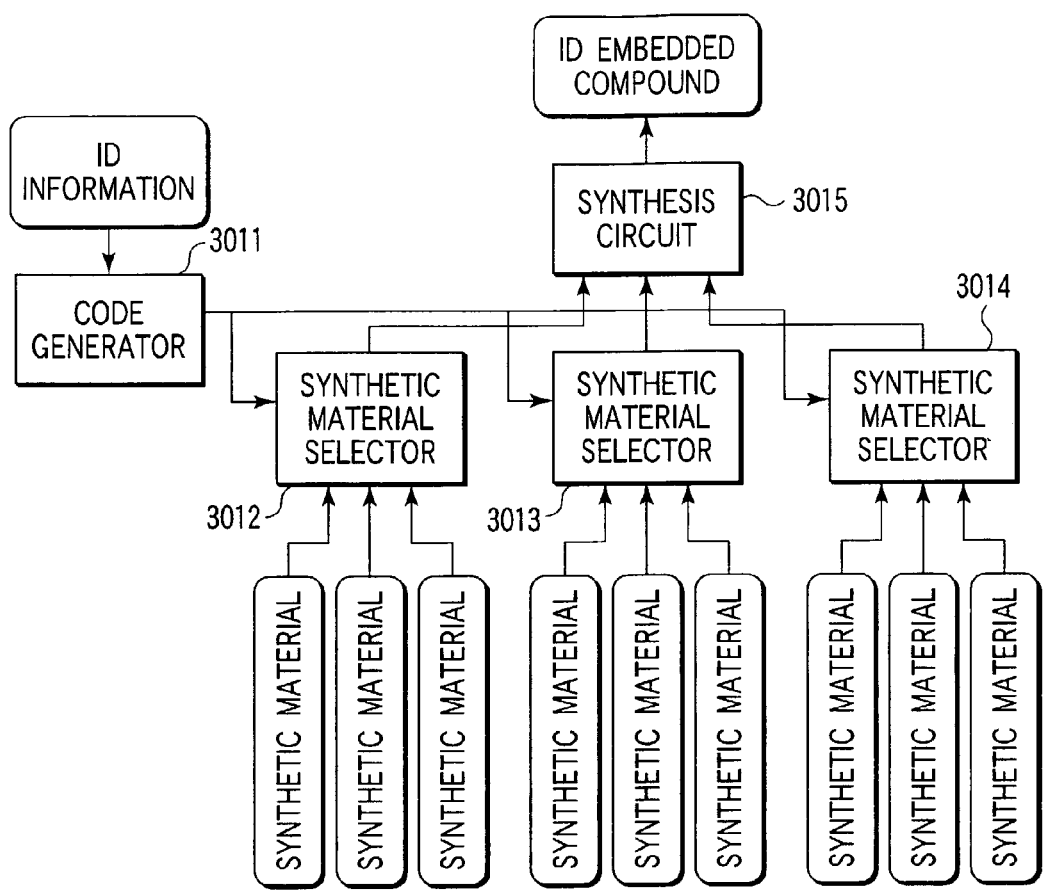
F I G. 30
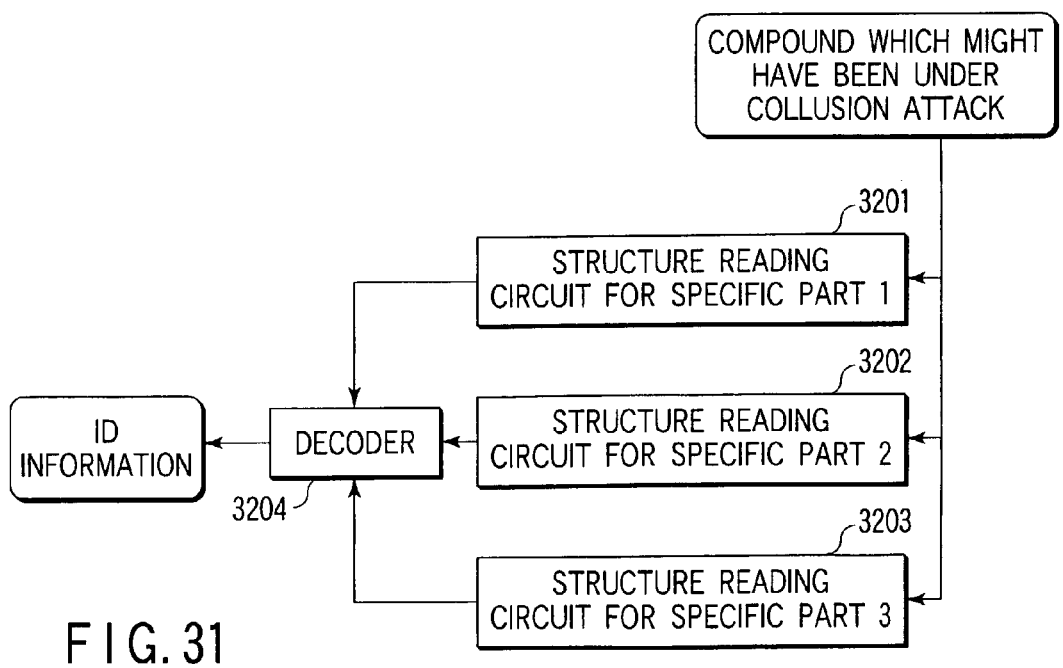
F I G. 31

IDENTIFICATION INFORMATION EMBEDDING APPARATUS AND IDENTIFICATION INFORMATION ANALYSIS APPARATUS

CROSS-REFERENCE TO RELATED APPLICATIONS

This application is based upon and claims the benefit of priority from the prior Japanese Patent Application No. 2002-019133, filed Jan. 28, 2002, the entire contents of which are incorporated herein by reference.

BACKGROUND OF THE INVENTION

1. Field of the Invention

The present invention relates to an identification information embedding apparatus which embeds a collusion-secure code indicative of identification information of an object in an object of, e.g., a copy of digital contents, and an identification information analysis apparatus which detects a collusion-secure code from an object and analyzes identification information.

2. Description of the Related Art

Digital contents (for example, a still picture, a moving picture, sound, music and others) include a plurality of items of digital data. Of the many kinds of data, there are some which can maintain the identity or the economic value of a work of the digital contents even if they are changed to some degree. By changing data which falls in such an allowable range, various kinds of information can be embedded in the digital contents. Such a technique is referred to as an electronic watermark.

With the electronic watermark technique, it is possible to embed various kinds of watermark information (for example, information to identify a copyright holder or a user of contents, information of rights of a copyright holder, conditions to utilize contents, confidential information required when utilizing contents, a copy control information and the like, combinations of such information and others) for variety of purposes (for example, control over utilization, copyright protection including copy control, promotion of secondary use and others) and detect/use them.

Here, consideration is given as to the application of the electronic watermark technique to embed information which individually identifies a copy (for example, watermark information uniquely corresponding to a user ID) when distributing these copies of the digital contents to many users.

A technique to embed (a code corresponding to) inherent identification information in a copy of digital contents functions to avoid an illegal copy of the digital contents and also serves as a post-relief when violation of the copyright occurs since a user who further duplicates a copy of the digital contents and runs it off as a pirate edition can be specified by detecting identification information from the pirate edition when this pirate edition goes into circulation.

Such a user tries to interpolate the identification information when creating the pirate edition. However, since the user does not know which part corresponds to bits forming (a code corresponding to) the identification information, he/she must considerably change the copy of the digital contents. By doing so, since the economic merit of the digital contents is lost, the motivation to illegally copy is diminished.

In such a circumstance, a "collusion attack" has emerged as a method which enables illegal copying.

The collusion attack utilizes the fact that different identification information is embedded in each copy. For example, by this method, when a plurality of people bring copies and compare them bit by bit, a part having a different value of digital data (embedded identification information) is found, and the identification information is changed and lost by changing only this part (for example, majority decision, minority decision, randomization and others). It is to be noted that a similar result may be obtained in some cases by performing an operation, e.g., averaging pixel values between the contents without effecting a specific comparison operation.

For instance, giving a simple example, it is assumed that (codes corresponding to) the following identification information are embedded in copies of Mr./Ms. A, Mr./Ms. B and Mr./Ms. C, respectively:

A: 00 . . . 00 . . .
B: 00 . . . 11 . . .
C: 11 . . . 00 . . .

When the part of the identification information is detected, this part can be changed into, e.g., (a code corresponding to) the following identification information which is different from that of each of Mr./Ms. A, Mr./Ms. B and Mr./Ms. C:

10 . . . 01 . . .

Therefore, there have been proposed various kinds of method which embed a code having a resistance to a collusion attack, i.e., a property capable of specifying a part or all of colluders even if under the collusion attack (which will be referred to as a collusion-secure code hereinafter) as an electronic watermark and a tracing algorithm based on the collusion-secure code (algorithm used to specify an identification number embedded in contents used for a collusion attack and specify user IDs of the colluders). For example, there is (1) Dan Boneh and James Shaw, "Collusion-Secure Fingerprinting for Digital Data," CRYPTO 195, 452-465, 1995 or (2) Hirofumi Muratani, "A Collusion-Secure Fingerprinting Code Reduced by Chinese Remaindering and Its Random-Error Resilience", Information Hiding Workshop 2001, 303-315, 2001.

The collusion-secure code disclosed in the cited reference (1) is defined as a code that there is a tracing algorithm which outputs at least one collusion ID belonging to C with respect to an arbitrary collusion C which is $|C| \leq c$ (c is the maximum number of collusions, i.e., a total number of colluders). In order to further strengthen the resistance to the collusion attack, namely, further increase the upper limit number of the number of collusions which disables specification of colluders, a code length to be embedded in the contents must be increased. On the other hand, since there is a limit in a code length to be embedded in contents, an upper limit is provided in the number of copies utilized for collusion attack in order to reduce a code length in this kind of collusion-secure code and the tracing algorithm based on this collusion-secure code. If the collusion attack is carried out using copies whose number exceeds an allowed number, there may occur an erroneous judgment that an identification number of a copy which does not concern the collusion attack is erroneously output as an identification number of a copy which has concerned the collusion attack and a person who is not a colluder is specified as a colluder.

In order to lower the probability of the erroneous judgment, the number of copies which are realistically likely to be prepared by colluders is assumed, a collusion-secure code must be designed in such a manner that an allowed number exceeds that number, and a large allowable number must be absolutely set, which leads to a large code length.

An attempt to decrease the code length is the cited reference (2). This code is a code with which reduction in code length is considerable when a total number of sets of identification information or a collusion size is large. This code has a structure of a "concatenated code" utilizing "Chinese Remainder Theorem" and allows a tracing error in not only an "inner code" but also an "outer code". In order to estimate a tracing error rate in an outer code, as a new "marking assumption," it is assumed that "respective residues forming a set of residue pairs obtained by decoding the inner code relative to a code word created by a collusion can be treated as random variables which take a value with probabilities in conformity with an independent and uniform distribution." The number of inner codes is determined in such a manner that a probability that a person who is not a colluder is accidentally regarded as a colluder with respect to a residue pair obtained from a predetermined number or more of the inner codes.

However, a problem in the cited reference (2) is that a reasonable ground is not provided to this assumption and the outer code formed by the stochastic argument based on this requires many inner codes with respect to a small c. Therefore, the number d of the inner codes cannot be suppressed relative to a small c, and the number of tracing errors with respect to the outer codes cannot be zero.

BRIEF SUMMARY OF THE INVENTION

Accordingly, the present invention is directed to a method and apparatus that substantially obviates one or more of the above problems due to limitations and disadvantages of the related art.

According to an embodiment of the present invention, an apparatus which analyzes identification information of an object based on data extracted from the object, comprises a colluder group extraction unit which extracts a colluder group having a predetermined relationship with the data among colluder groups including combinations of an arbitrary number of identification information which is not more than a predetermined maximum number.

According to another embodiment of the present invention, an identification information embedding apparatus comprises a code generator which generates a collusion-secure code corresponding to identification information, a restriction being provided between a maximum number of colluders defined by a tracing algorithm, the number of components forming the code, and a range of the identification information; and an embedding circuit which embeds the generated code in an object.

BRIEF DESCRIPTION OF THE SEVERAL VIEWS OF THE DRAWING

FIG. 7 is a view illustrating an example of a component code generated by the electronic watermark embedding apparatus according to the embodiment;

FIG. 8 is a view illustrating an example of an integer set formed of a plurality of integers corresponding to each user ID in the embodiment;

FIG. 9 is a view illustrating an example of a collusion-secure code corresponding to each user ID in the embodiment;

FIGS. 10A, 10B, 10C, and 10D are views illustrating a position of a boundary concerning a bit pattern in each component code in the embodiment;

FIG. 16 is a view illustrating a tracing algorithm according to the embodiment;

FIGS. 17A and 17B are views for illustrating the tracing algorithm according to the embodiment;

FIGS. 18A and 18B are views illustrating the tracing algorithm according to the embodiment;

FIGS. 19A, 19B, and 19C are views illustrating a tracing algorithm concerning the embodiment;

FIG. 24 is a flowchart showing an example of a processing procedure at step S22 illustrated in FIG. 22;

FIG. 30 is a view showing another structural example of the electronic watermark embedding apparatus relative to the chemical compound according to the second embodiment; and FIG. 31 is a view showing a still another structural example of the electronic watermark analysis apparatus relative to the chemical compound according to the second embodiment.

DETAILED DESCRIPTION OF THE INVENTION

An embodiment of an identification information embedding apparatus and an identification information analysis apparatus according to the present invention will now be described with reference to the accompanying drawings.

First Embodiment

As an application of an electronic watermark, description will be given as to a case where identification information which differs in accordance with each copy is embedded as watermark information in each of the copies (for example, a still picture, a moving picture, sound, music and others) of the same digital contents and identification information of colluders is traced. It is to be noted that description will be mainly given as to a case where a user identification information (user ID) of a user corresponding to the copy, namely, a user who utilizes the copy (for example, a user who delivers or lends the copy with a recording medium or a communication medium being used as a medium) is used as identification information hereinafter but information having the user ID subjected to a predetermined change may be used as identification information, or information other than the user ID or information obtained by conversion from such information may be used as identification information. It is to be noted that information such as a date and an hour of utilization or a place of utilization and others may be included in the user ID.

Of course, many other various kinds of watermark information (for example, information concerning a copyright of contents, information concerning rights such as a copyright, information concerning utilization conditions of contents, confidential information required for this utilization, copy control information and others, or combinations of such information) may be embedded in copies of digital contents and detected, but a structure of a part concerning any other water mark information is arbitrary when using such watermark information.

The following structural view can be also achieved as a function block diagram of the apparatus, and a function module view or a procedure view of the software (program).

Figure 1:
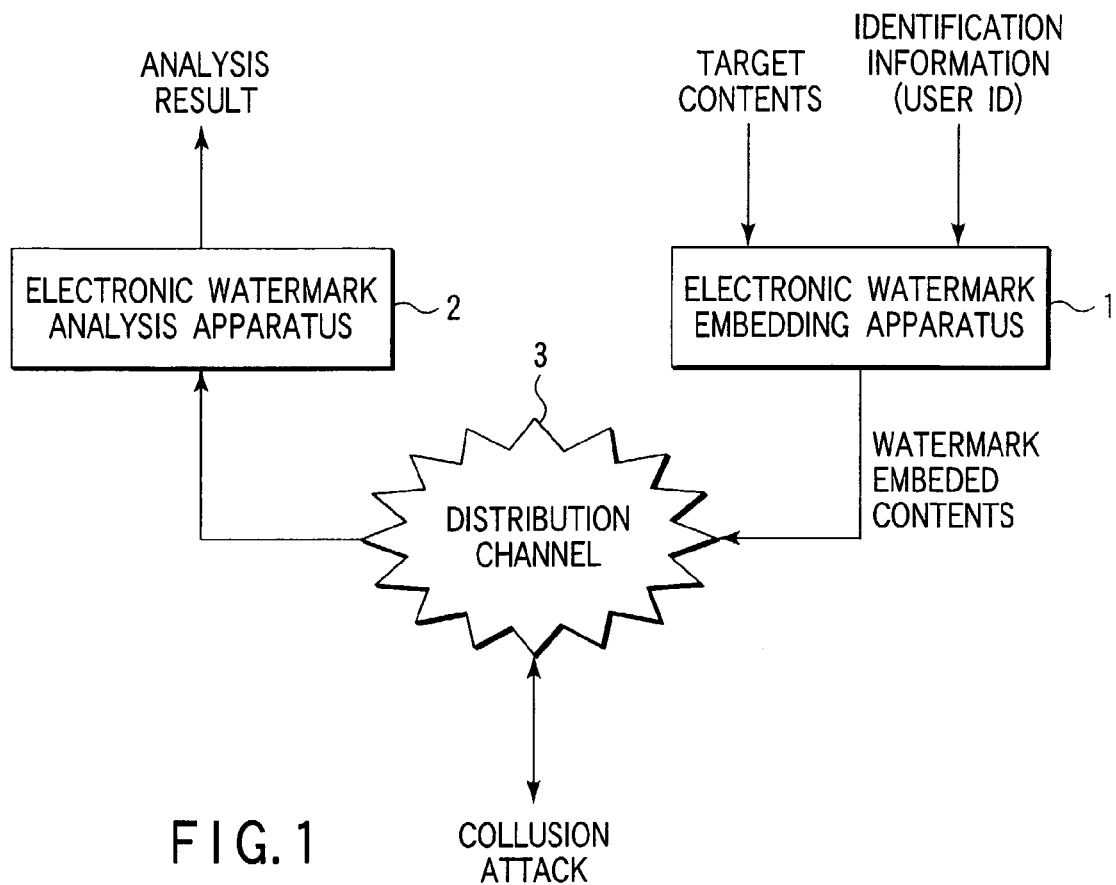
FIG. 1 is a view showing a schematic structure of a contents distribution system including an electronic watermark embedding apparatus and an electronic watermark analysis apparatus according to an embodiment of the present invention.

FIG. 1 shows a conceptual view of a digital contents distribution system including an electronic watermark embedding apparatus and an electronic watermark analysis apparatus according to an embodiment of the present invention.

The electronic watermark embedding apparatus 1 and the electronic watermark analysis apparatus 2 are included in, e.g., a contents provider system and managed thereby.

Alternatively, the electronic watermark embedding apparatus 1 may be provided in a user system (for example, a user system used to utilize contents (for example, connected to or incorporated in a computer system or a dedicated device or the like)), and the electronic watermark analysis apparatus 2 may be provided in a contents provider system.

Watermark information is embedded in a copy of digital contents before transferring the copy to a user in the former case, and it is embedded before the copy is used by a user in the latter case.

A method of embedding desired watermark data in digital contents in the electronic watermark embedding apparatus 1 or a method of taking out the watermark data itself from the digital contents in the electronic watermark analysis apparatus 2 may be any method.

The electronic watermark embedding apparatus 1 can be realized as software (program) as well as hardware. Likewise, the electronic watermark analysis apparatus 2 can be realized as software (program) as well as hardware. In addition, when the electronic watermark embedding apparatus 1 and the electronic watermark analysis apparatus 2 are used in the contents provider system, they can be integrated and realized.

Figure 2:
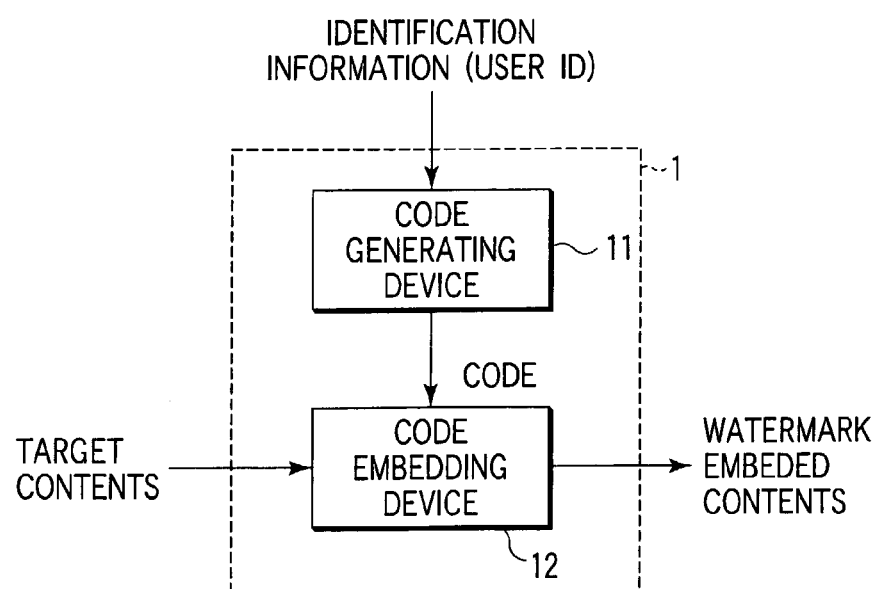
FIG. 2 is a view showing a structural example of the electronic watermark embedding apparatus according to the embodiment.

FIG. 2 shows a structural example of the electronic watermark embedding apparatus 1. The electronic watermark embedding apparatus 1 includes a code generating device 11 which generates a collusion-secure code corresponding to identification information (for example, a user ID) to be embedded, and a code embedding device 12 which embeds the generated collusion-secure code (embedded code) in target contents.

Upon receiving target contents and identification information (for example, a user ID of a target user) to be embedded in this target contents, the electronic watermark embedding apparatus 1 generates the collusion-secure code corresponding to the identification information, and outputs the collusion-secure code embedded contents as a copy (for example, a copy for a user of that user ID) corresponding to the identification information. In case of utilizing any other watermark information, any other watermark information is embedded according to needs at that time.

Incidentally, for example, when the identification information is not equal to the user ID and the user ID is given, pre-processing such as conversion of the given user ID into the identification information is carried out.

Each copy of contents corresponding to the identification information obtained by the electronic watermark embedding apparatus 1 is distributed through a distribution path 3 with a recording medium or a communication medium being used as a medium. A collusion attack using a plurality of copies is carried out in this distribution path 3.

Figure 3:
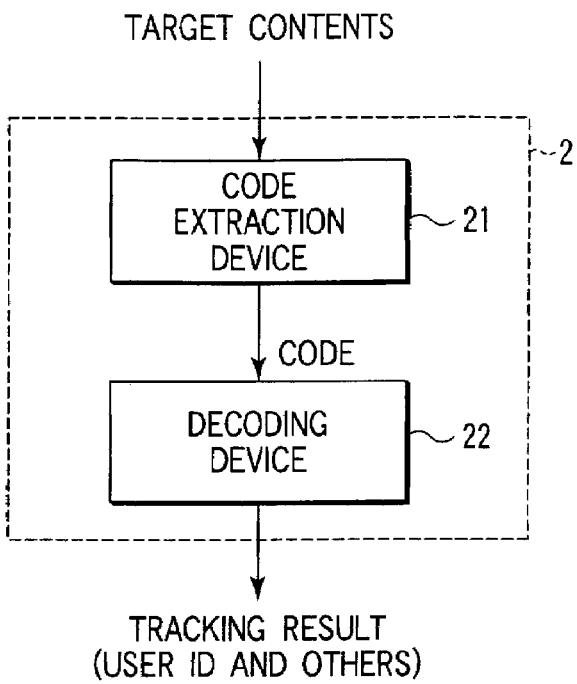
FIG. 3 is a view showing a structural example of the electronic watermark analysis apparatus according to the embodiment.

FIG. 3 shows a structural example of the electronic watermark analysis apparatus 2.

As shown in FIG. 3, the electronic watermark analysis apparatus 2 includes a code extraction device 21 and a decoding device 22.

The code extraction device 21 extracts an embedded code from a copy of contents as a detection target. Irrespective of presence/absence of a collusion attack, the code is extracted on the assumption that the collusion-secure code in case of no collusion attack is embedded. In fact, not only the embedded collusion-secure code is extracted, but the code changed under the collusion attack may be extracted in some cases.

The decoding device 22 specifies (or presumes) that there has been no collusion attack, or one or a plurality of sets of identification information (for example, a user ID) corresponding to a collusion-secure code embedded in a copy which is considered to be used in a collusion attack by executing the later-described tracing algorithm with respect to the extracted code. The specified (assumed) user ID is a result of tracing.

Incidentally, for example, when the identification information is not equal to the user ID and the user ID must be obtained, the post-processing such as conversion of the specified identification information into the user ID is carried out.

The electronic watermark embedding apparatus 1 will now be described in detail hereinafter.

Here, description will be given as to a case where the identification information is equal to the user ID. Therefore, when description is given as to the case where the identification information is equal to the user ID, the user ID generally means the identification information.

Figure 4:
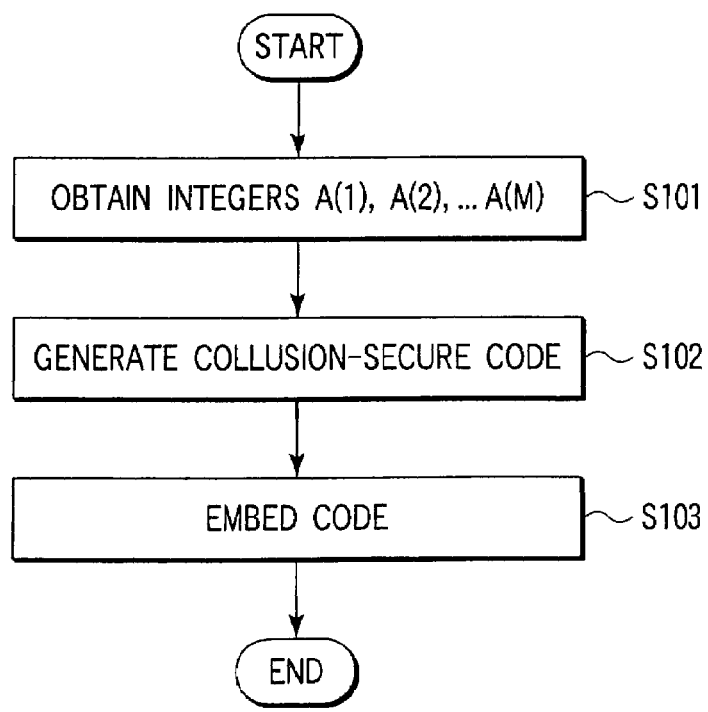
FIG. 4 is a flowchart showing an example of schematic procedures of the electronic watermark embedding apparatus according to the embodiment.

FIG. 4 shows an example of schematic procedures.

A code generating device 11 obtains M (M is a plural number) integers $A(1), A(2), \ldots A(M)$ corresponding to the identification information (namely, the user IDs in this example) to be embedded in a target copy (step S101). There is a method of previously obtaining and storing the M integers and a method of obtaining them when necessary.

There are various methods of obtaining the integers $A(1), A(2), \ldots A(M)$.

For example, each integer $A(i)$ in each i (i=1 to M) may take any value of 0 to $N(i)-1$. Here, for example, in this embodiment in which these integers are predetermined positive integers which are different from each other, it is desirable that $N(1), N(2), \ldots N(M)$ are relatively prime integers. It is to be noted that $N(1)<N(2)< \ldots < N(M)$ may be set.

At this moment, there is a method of randomly allocating a value in a range of 0 to $N(i)-1$ to each of the M integers $A(i)$ corresponding to the user IDs and a method of allocating a value in a range of 0 to $N(i)-1$ to each of them in accordance with a definite rule. Further, in both cases, for each user ID, there are a method of exclusively allocating a set of the M integers in such a manner that at least one of $A(1), A(2), \ldots A(M)$ is different and a method of allowing redundant allocation of a set of the M integers that $A(1), A(2), \ldots A(M)$ are all the same to a plurality of the user IDs. In this embodiment, it is desirable to enable specification of the unique identification information from the set of the M integers by adopting the former method.

As the method of exclusively allocating values, for example, there is a method by which some integers in a range of 0 to $N(1) \times N(2) \times \ldots \times N(M)-1$ are used as values of the user IDs, and a remainder obtained by dividing a target user ID by $N(i)$ with respect to each of the M integers $A(i)$ is determined as a value of $A(i)$ corresponding to the user ID. In this embodiment, it is desirable that the M figures $N(1), N(2), \ldots N(M)$ are relatively prime integers. It is to be noted that $N(1)<N(2)< \ldots <N(M)$ is set. It is to be noted that a set of the M integers corresponding to the identification information (=V) in this case $\{A(1)=V \bmod N(1), A(2)=V \bmod N(2), \ldots A(M)=V \bmod N(M)\}$ corresponds to a set of the reference residues $\{r^{(0)}_1, r^{(0)}_2, \ldots r^{(0)}_M\}$ which will be described later in detail. Further, in this case, as will be described later in detail, it is preferable to provide a definite restriction between an assumed maximum number of colluders c, the number M of the integers (=the number of component codes) and a range of the identification to be used (for example, serial numbers starting from 0).

Incidentally, instead of the above, for example, the identification information is not equal to the user ID, there is also a method by which predetermined conversion such that the user ID is subjected to predetermined conversion and thereby the converted value is equal to the identification information becomes an integer in a range to be used from 0 to $N(1) \times N(2) \times \ldots \times N(M)-1$ is prepared, and a remainder obtained by dividing the identification information as a result of applying the predetermined conversion to the target user ID by $N(i)$ is determined as a value of $A(i)$ corresponding to the identification information corresponding to the user ID. In this case, since the identification information corresponding to the user ID is first obtained in the decoding device 22, the reverse conversion of the predetermined conversion is applied to the obtained identification information in the decoding device 22 or the like if the user ID must be acquired, thereby obtaining the corresponding user ID.

Furthermore, here, although description is given as to the example in which a code corresponding to the user ID is embedded, for example, information indicative of the correspondence with information (for example, a user name or a user ID and the like) used to specify a copy ID of a copy of contents and its user may be recorded in a predetermined storage device, it is determined that the identification information is equal to the copy ID, and a code corresponding to the copy ID according to the user ID of that user may be embedded in the copy of the contents. In this case, since the copy ID corresponding to the user ID is obtained in the decoding device 22, a corresponding user ID is obtained from the acquired copy ID in the decoding device 22 and the like if the user ID must be obtained.

Moreover, for example, when a code corresponding to the copy ID according to the user ID is embedded as described above and when the identification information is not equal to the copy ID, there is a method of determining a remainder obtained by dividing the identification information which is a result of applying the predetermined conversion to the copy ID corresponding to the user ID by $N(i)$ as a value of $A(i)$ corresponding to the identification information which corresponds to the copy ID according to the user ID. In this case, since the identification information is first obtained in the decoding device 22, the reverse conversion of the predetermined conversion is applied to the obtained identification information in the decoding device 22 and the like and the corresponding copy ID is obtained, thereby acquiring the user ID from the copy ID.

Then, the code generating device 11 generates a collusion-secure code corresponding to the user ID from the M integers $A(1), A(2), \ldots A(M)$ corresponding to the user ID (identification information) to be embedded in the target copy (step S102). There are a method of previously generating and storing the collusion-secure code corresponding to each user ID and a method of generating it when necessary.

The collusion-secure code corresponding to each user ID is generated by obtaining component codes $W(1), W(2), \ldots W(M)$ with respect to each of the M integers $A(1), A(2), \ldots A(M)$ corresponding to the user ID and combining (connecting) them.

As the component code $W(i)$ corresponding to the integer $A(i)$, it is possible to use, for example, $\Gamma_0(n, d)$ code (which is obtained by determining continuous d bits formed of only 1 or 0 as one unit $B(j)$ and concatenating $B(0)$ to $B(n-2)$; where $B(0)$ to $B(n-2)$ consist of all 0 or all 1, or $B(0)$ to $B(m-1)$ consist of only 1 and $B(m)$ to $B(n-2)$ consist of only 1.

For example, giving a simple example of a method by which a remainder obtained by dividing a target user ID by $N(i)$ is determined as a value of the integer $A(i)$ corresponding to the user ID when the user ID is selected from integers in a predetermined range from 0 to $N(1) \times N(2) \times \ldots \times N(M)-1$, assuming that n=5 and d=3 in case of $N(1)=5$, and the code $\Gamma_0(5, 3)$ is as follows:

when $A(1) = 0 : W(1) = 111\ 111\ 111\ 111$
when $A(1) = 1 : W(1) = 000\ 111\ 111\ 111$
when $A(1) = 2 : W(1) = 000\ 000\ 111\ 111$
when $A(1) = 3 : W(1) = 000\ 000\ 000\ 111$
when $A(1) = 4 : W(1) = 000\ 000\ 000\ 000$ The collusion-secure code can be generated by concatenating the component codes W(i) corresponding to the thus obtained respective A(i).

As to this code, 1 and 0 are arranged so as to be continuous in units of d bits, and 1 or 0 whose number is less than d bits does not independently exist. In the above example, it can be understood that 1 or 0 whose number is less than 3 bits does not independently exist. Therefore, if 1 or 0 whose number is less than d bits independently exists, it can be assumed that the collusion attack has been carried out. If 1 or 0 whose number is less than d bits does not independently exist, it can be assumed that there has been no collusion attack.

The thus generated collusion-secure code is embedded in the target contents by the code embedding device 12 of the electronic watermark embedding apparatus 1 (step S103). As described above, the method of embedding the generated collusion-secure code in target contents is not restricted to a particular method, and the present invention can be applied to any method.

Figure 5:
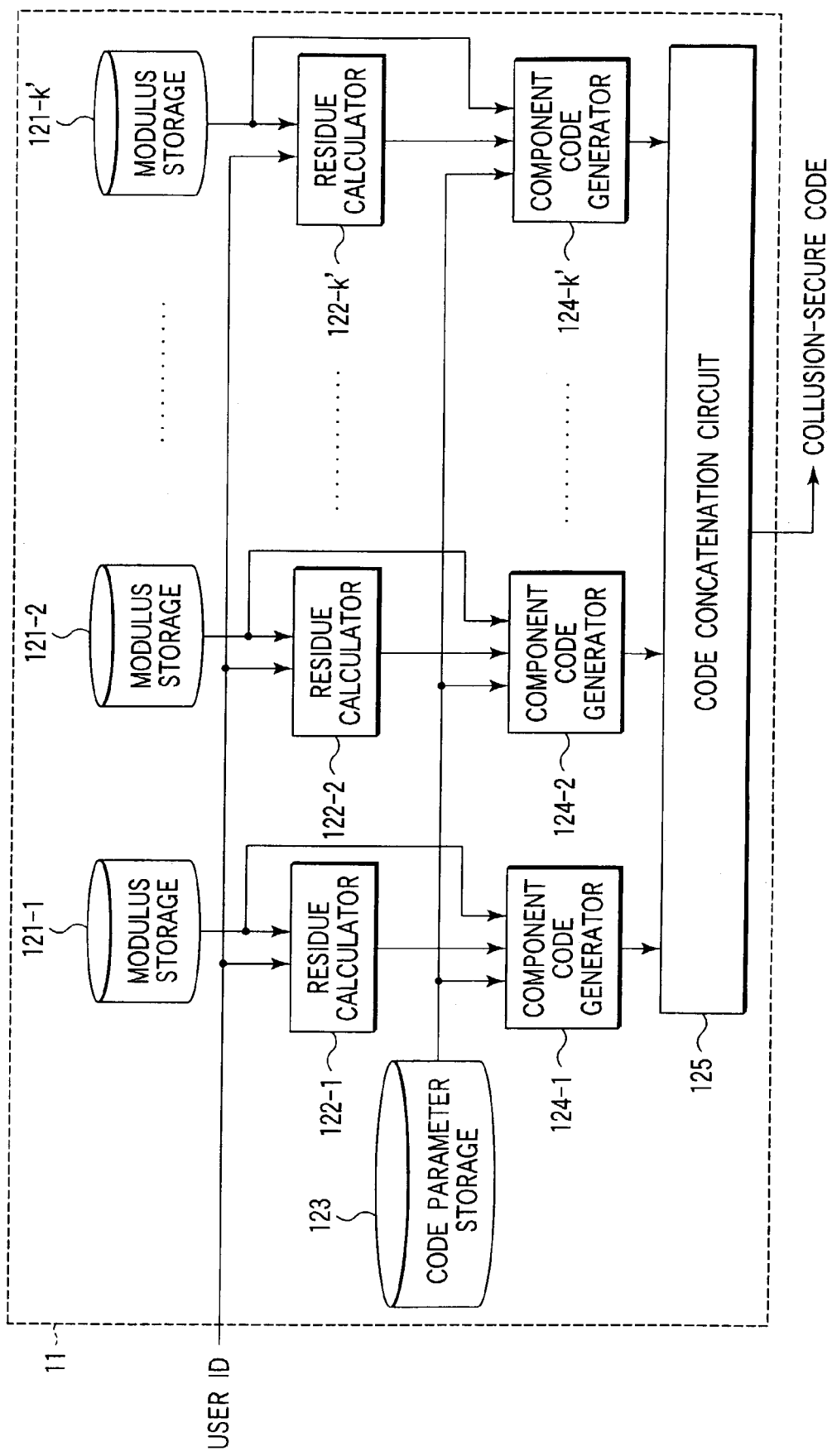
FIG. 5 is a view showing a structural example of a code generator of the electronic watermark embedding apparatus according to the embodiment.

FIG. 5 shows a structural example of the code generating device 11.

This code generating device 11 comprises k' (=M) modulus storages 121-1, 121-2, . . . 121-k', k' residue calculators 122-1, 122-2, . . . 122-k', k' component code generators 124-1, 124-2, . . . 124-k', a code parameter storage 123, and a code concatenation circuit 125.

Predetermined positive integers different from each other, e.g., positive integers $p_i$(=N(i)) (i=1, 2, . . . k') which are relatively prime integers are stored in the modulus storages 121-1, 121-2, . . . 121-k', and these integers $p_i$ are supplied to the residue calculators 122-1, 122-2, . . . 122-k' as modulo. The residue calculators 122-1, 122-2, . . . 122-k' obtain residues $u_i$=u mod $p_i$(i=1, 2, . . . k') having integers $p_i$ as modulo with respect to the input user ID=u. That is, as a set of a plurality of integral elements corresponding to the input user IDs (={A(1), A(2), . . . A(M)}), the residues $u_i$=u mod $p_i$ (i=1, 2, . . . k') are calculated by the residue calculators 122-1, 122-2, . . . 122-k'.

The component code generators 124-1, 124-2, . . . 124-k' respectively generate a component code $\Gamma_0(p_i, t)$ comprising the $\Gamma_0(n, d)$ code indicative of the residues $u_i$ (i=1, 2, . . . k') obtained by the residue calculators 122-1, 122-2, . . . 122-k' in accordance with the code parameter t stored in the code parameter storage 123.

The code concatenation circuit 125 generates the collusion-secure code which is watermark information by concatenating the respective component codes $\Gamma_0(p_i, t)$ generated by the component code generators 124-1, 124-2, . . . 124-k'.

Figure 6:
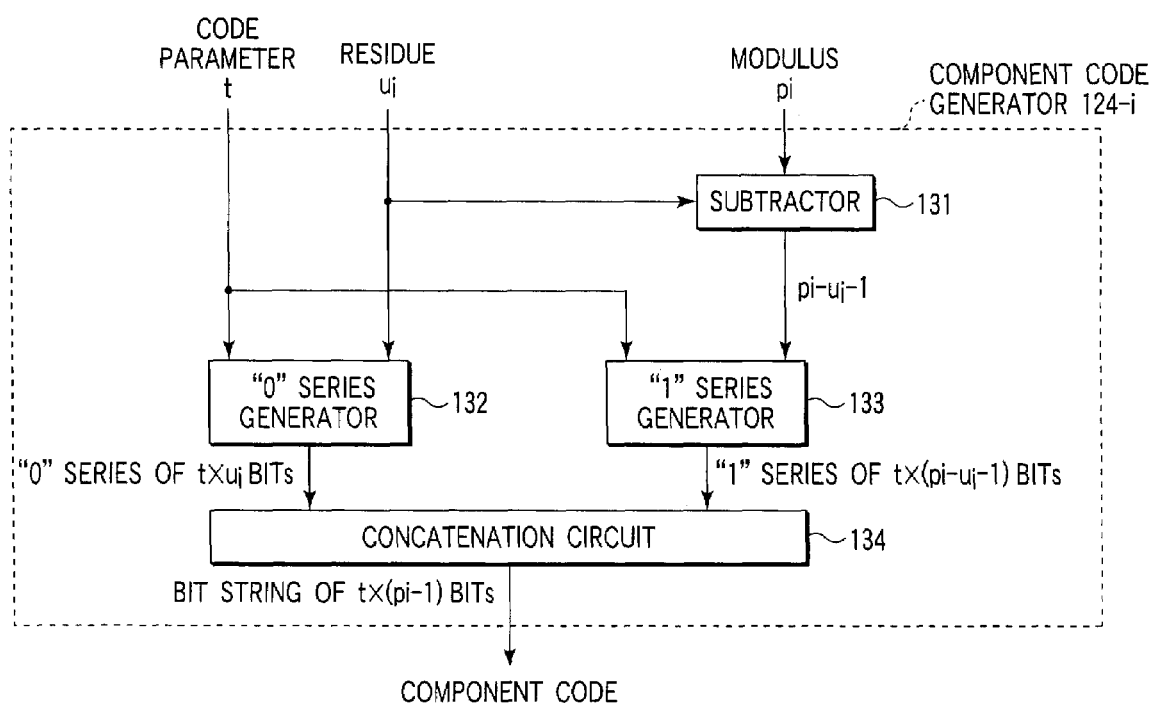
FIG. 6 is a view showing a structural example of a component code generator of the code generator according to the embodiment.

FIG. 6 shows a structure of one generator 124-i of the component code generators 124-1, 124-2, . . . 124-k'.

Assuming that the code parameter is t, the residue is $u_i$ and the modulus is $p_i$, a subtracter 131 calculates $p_i-u_i-1$. A "0" series generator 132 generates a continuous "0" series formed of t×$u_i$ bits based on the code parameter t and the residue $u_i$, and a"1" series generator 133 generates a continuous "1" series formed of t×($p_i-u_i-1$) bits based on the code parameter t and an output $p_i-u_i-1$ from the subtracter 131. Then, the "0" series and the "1" series are concatenated by the concatenation circuit 134, and the bit string formed of t×($p_i-1$) bits is generated as a component code $\Gamma_0(p_i, t)$ formed of the $\Gamma_0(n, d)$ code.

FIG. 7 shows an example of a component code (component code before being under the collusion attack) of the thus generated collusion-secure code. Component codes formed of the "0" series and the "1" series of B(0), . . . B(n−2) are allocated in accordance with n user IDs (identification information) from 0 to n−1.

Here, the above-described code generation method will now be described based on a simple example in which small values are used.

At first, it is determined that the number M of the integers is 3, N(1)=3, N(2)=5, and N(3)=7. In this case, A(1) is any of 0 to 2, A(2) is any of 0 to 4, and A(3) is any of 0 to 6.

Then, since N(1)×N(2)×(N(3)−1)=104, all or a part of the range of 0 to 104 is used as the user ID (identification information). Here, 0 to 14 in this range is used as the user ID.

For example, in case of the user ID=7, the following is achieved:

$A(1) = 7 \mod N(1) = 7 \mod 3 = 1,$
$A(2) = 7 \mod N(2) = 7 \mod 5 = 2,$
$A(3) = 7 \mod N(3) = 7 \mod 7 = 0.$ FIG. 8 shows A(1), A(2), and A(3) obtained with respect to each identification information (user IDs=0 to 14) in this example.

Then, a component code W1 corresponding to each of A(1)=0, A(1)=1, and A(1)=2 when d=3 in the $\Gamma_0(n, d)$ code is as follows (it is to be noted that 0 or 1 is written in units of 3 bits for better understanding):

$A(1) = 0 : W1 = 111\ 111$
$A(1) = 1 : W1 = 000\ 111$
$A(1) = 2 : W1 = 000\ 000$

Further, likewise, a component code W2 corresponding to each of A(2)=0, A(1)=1, A(2)=2, A(2)=3, and A(2)=4 is as follows:

$A(2) = 0 : W2 = 111\ 111\ 111\ 111$
$A(2) = 1 : W2 = 000\ 111\ 111\ 111$
$A(2) = 2 : W2 = 000\ 000\ 111\ 111$
$A(2) = 3 : W2 = 000\ 000\ 000\ 111$
$A(2) = 4 : W2 = 000\ 000\ 000\ 000$

Furthermore, likewise, each component code W2 corresponding to each of A(3)=0, A(3)=1, A(3)=2, A(3)=3, A(3)=4, A(3)=5, and A(3)=6 is as follows:

A(3) = 0 : W3 = 111 111 111 111 111 111
A(3) = 1 : W3 = 000 111 111 111 111 111
A(3) = 2 : W3 = 000 000 111 111 111 111
A(3) = 3 : W3 = 000 000 000 111 111 111
A(3) = 4 : W3 = 000 000 000 000 111 111
A(3) = 5 : W3 = 000 000 000 000 000 111
A(3) = 6 : W3 = 000 000 000 000 000 000

Therefore, for example, if the user ID=7, since A(1)=1, A(2)=2, and A(3)=0, the following can be achieved:

W1 = 000 111
W2 = 000 000 111 111
W3 = 111 111 111 111 111 111

The collusion-secure code corresponding to the user ID=7 is as follows by concatenating these codes (it is to be noted that the code is divided and written at boundaries corresponding to W1 to W3 for better understanding):

000111 000000111111 111111111111111111

FIG. 9 shows the collusion-secure code (W(1)+W(2)+W(3)) obtained with respect to each identification information (user ID=0 to 14) in this example.

The electronic watermark analysis apparatus 2 will now be described in detail hereinafter.

Here, the collusion attack will be explained by utilizing the above example.

For example, the following code is embedded as a collusion-secure code in contents obtained by a user having the user ID=2 (see FIGS. 8 and 9):

000000 000000111111 000000111111111111

Furthermore, for example, the following code is embedded as a collusion-secure code in contents obtained by a user having the user ID=3 (see FIGS. 8 and 9):

111111 000000000111 000000000111111111

In this case, comparing the contents brought by the user having the user ID=2 and the user having the user ID=3, it can be understood that the first to sixth bits, the 13th to 15th bits and the 25th to 27th bits in the 36 bits are different. Thus, since it can be understood that they a part of (collusion-secure code corresponding to) the identification information, some of the first to sixth bits, the 13th to 15th bits and the 25th to 27th bits are changed and, for example, the following change is applied:

010101 000000010111 000000101111111111

Similarly, for example, the user having the user ID=7 and the user having the user ID=8 apply the following change:

000010 000000101111 010111111111111111

Moreover, likewise, for example, four users having the user IDs=3, 4, 5, and 6 apply the following change:

010101 010101010101 000000000010101010

As described above, in the electronic watermark analysis apparatus 2 according to this embodiment, a code extraction device 21 extracts an embedded code (an embedded collusion-secure code or a code changed by the collusion attack) from a copy of contents as a detection target.

Then, the decoding device 22 executes a tracing algorithm with respect to the extracted code.

Here, the outline of the tracing algorithm will now be described.

Description will be first given as to a residue pair and a reference residue.

As shown in FIG. 10A, positions of both ends of the component code and a position at a boundary of adjacent elements B(e−1) and B(e) are digitalized and expressed in accordance with each of the component codes (three component codes in the above example) of the extracted code (a generated collusion-secure code or a collusion-secure code which has been under the collusion attack). That is, assuming that the number of elements B(j) of the i-th component code W(i) is N(i)−1 and N(i) is represented by N in FIG. 10A, a position of the element B(0) at the left end is expressed as 0; a position at a boundary of the elements B(e−1) and B(e), e; a position of the element B(N−2) at the right end, N−1.

Then, a boundary between an element B(s1−1) formed of only 0 and an element B(s1) including at least one 1 which appear when seeing the i-th component code W(i) detected from the contents from the bit at the left end is obtained, and a value s1 indicative of the position corresponding to the boundary is represented as $r^{(-)}_i$. On the other hand, a boundary between an element B(s2) formed of only 1 and an element B(s2−1) including at least one 0 which appear when seeing the same from the bit at the right end is obtained, and a value s2 indicative of the position corresponding the boundary is represented as $r^{(+)}_i$.

For example, in the example of the code illustrated in FIG. 10B, $r^{(-)}_i=2$ and $r^{(+)}_i=4$ can be obtained.

Incidentally, when the i-th component code W(i) comprises only 0, $r^{(-)}_i=r^{(+)}_i=N(i)-1$ is obtained.

In addition, when the i-th component code W(i) comprises only 1, $r^{(-)}_i=r^{(+)}_i=0$ is obtained.

Additionally, when there is no boundary between the element B(s1−1) formed of only 0 and the element B(s1) including 1, $r^{(-)}_i=0$ is obtained.

Further, when there is no boundary between the element B(s2) formed of only 1 and the element B(s2−1) including 0, $r^{(+)}_i=N(i)-1$ is obtained.

In this manner, a pair of position information $r^{(-)}_i$ and $r^{(+)}_i$ can be obtained from one component code W(i). This pair of $r^{(-)}_i$ and $r^{(+)}_i$ is referred to as a residue pair. It is to be noted that a set of all residue pairs $r^{(-)}_1, r^{(+)}_1, r^{(-)}_2, r^{(+)}_2, \ldots r^{(-)}_M,$ and $r^{(+)}_M$ obtained from all the component codes W(i) will be also referred to as a residue-pair representation hereinafter.

It is to be noted that since there is no element of the component code in which both 0 and 1 exist in the collusion-secure code itself generated from the identification information (determined as=V), considering a representation corresponding to the residue pair, $r^{(-)}_i=r^{(+)}_i=V \bmod N(i)$ can be constantly obtained. For instance, in the example of the code illustrated in FIG. 10C, $r^{(-)}_i=2$ and $r^{(+)}_i=2$ can be obtained. Furthermore, for instance, in the example of the code shown in FIG. 10D, $r^{(-)}_i=4$ and $r^{(+)}_i=4$ can be obtained.

The original boundary positional information (value indicative of a boundary position of a block formed of 0 and a block formed of 1 (however, a position at the left end when the component code comprises only 1, and a position at the right end when the component code comprises only 0)) in each component code (W(i)) in the collusion-secure code itself generated from the identification information, namely, a residue which can be a reference ($r^{(-)}_i=r^{(+)}_i=V \bmod N(i)$) will be referred to as a reference residue and expressed as $r^{(0)}_i$ hereinafter. It is to be noted that a set of all reference residues $r^{(0)}_1, r^{(0)}_2, \ldots r^{(0)}_M$ obtained from all the component codes W(i) will be referred to as a reference residue representation hereinafter.

Meanwhile, in the tracing algorithm, when each component code of the detected code is examined and there is detected a component code having a block in which 1 or 0 whose number is less than a predetermined d(3 in the above example) bits independently exists, it can be determined that there has been a collusion attack. Further, assuming that the collusion number (the number of colluders) is not more than a predetermined allowable number c, one or a plurality of user IDs (identification information) corresponding to the collusion-secure code which is considered to be embedded in a copy used in the collusion attack can be obtained based on a set of all the residue pairs, namely, the residue-pair representation $(r^{(-)}_i, r^{(+)}_i$ (i=1 to M)) obtained from all the component codes W(i), and they can be specified as user IDs of colluders who have performed the collusion attack.

As to the component code M(i) corresponding to each A(i), different parts obtained from a plurality of copies can be necessarily obtained as continuous elements B because of the property of the code as apparent from comparison of the codes shown in the above example, namely, the following codes:

A(3) = 0 : W3 = 111 111 111 111 111 111
A(3) = 1 : W3 = 000 111 111 111 111 111
A(3) = 2 : W3 = 000 000 111 111 111 111
A(3) = 3 : W3 = 000 000 000 111 111 111
A(3) = 4 : W3 = 000 000 000 000 111 111
A(3) = 5 : W3 = 000 000 000 000 000 111
A(3) = 6 : W3 = 000 000 000 000 000 000

Therefore, both 0 and 1 exist in the continuous part by a change due to the collusion attack.

Moreover, in a given component code (i), it can be understood that a position of the left end and a position of the right end of the continuous part (block) in which 1 or 0 whose number is less than d bits independently exists, namely, $r^{(-)}_i$ and $r^{(+)}_i$ necessarily correspond to a position of a partition between 0 and 1 of the component code of the collusion-secure code embedded in any of a plurality of copies used in the collusion attack (a position of the component code at the left end when the component code comprises all 1, and a position of the component code at the right end when a component code comprises all 0), i.e., $r^{(-)}_i = r^{(+)}_i$. Such information is obtained in accordance with each component code W(i). By analyzing such information $r^{(-)}_1, r^{(+)}_1, r^{(-)}_2, r^{(+)}_2, \ldots r^{(-)}_M,$ and $r^{(+)}_M$, the user ID corresponding to the collusion-secure code considered to be embedded in the copy used in the collusion attack can be specified as a user ID of a colluder who has performed the collusion attack.

As a simple example, in the collusion attack by two users, in each component code, $r^{(-)}_i$ corresponds to $r^{(-)}_i = r^{(+)}_i$ of the code embedded in the copy that one of the two users has, and $r^{(+)}_i$ corresponds to $r^{(-)}_i = r^{(+)}_i$ of the code embedded in the copy that the other user has. The correspondence of one code and the other code can differ in accordance with each component code. If there is such a collusion-secure code which has one selected from $r^{(-)}_1$ and $r^{(+)}_1$, one selected from $r^{(-)}_2$ and $r^{(+)}_2$, one selected from $r^{(-)}_M$ and $r^{(+)}_M$ as a position of the partition between 0 and 1 of each component code, that is a solution to be obtained, and the user ID corresponding to the collusion-secure code represents a colluder.

For example, as shown in the examples of FIGS. 8 and 9, the following code is embedded as the collusion-secure code in the contents obtained by the user having the user ID=2:

000000 000000111111 000000111111111111

The following code is embedded as the collusion-secure code in the contents obtained by the user having the user ID=3:

111111 000000000111 000000000111111111

These two users perform the collusion attack and change the collusion-secure code as follows:

010101 000000010111 000000101111111111

In this case, the following can be obtained in this changed code:

$$r^{(-)}_1 = 0, r^{(+)}_1 = 2$$
$$r^{(-)}_2 = 2, r^{(+)}_2 = 3$$
$$r^{(-)}_3 = 2, r^{(+)}_3 = 3$$

Referring to FIG. 8 or FIG. 9, since the user ID=2 satisfies $r^{(+)}_1=2$, $r^{(-)}_2=2$ and $r^{(-)}_3=2$ and the user ID=3 satisfies $r^{(-)}_1=0$, $r^{(+)}_2=3$ and $r^{(+)}_3=3$, it is possible to pin down that the collusion attack has been performed by the user ID=2 and the user ID=3 and the codes used in the collusion attack are the following codes:

000000 000000111111 000000111111111111; and 111111 000000000111 000000000111111111

Meanwhile, since the residue pair $r^{(-)}_i$ and $r^{(+)}_i$ ($r^{(-)}_i$ is not equal to $r^{(+)}_i$) in a given component code W(i) after the collusion attack is determined by the boundary position in the component code W(i) corresponding to the user IDs of the two users even if three or more users have performed the collusion attack, the boundary position in the component code W(i) of the user ID which has the boundary at a position other than $r^{(-)}_i$ and $r^{(+)}_i$ does not appear in the residue pair $r^{(-)}_i$ and $r^{(+)}_i$ obtained from the code detected from the target contents. Therefore, in the collusion attack by three or more users, all the boundary positions $r^{(-)}_i = r^{(+)}_i$ (namely, the reference residue $r^{(0)}_i$) that all the component codes originally have cannot be obtained with respect to the collusion-secure code embedded in a given copy used in the collusion attack in some cases. However, on the other hand, with respect to the collusion-secure code embedded in a given copy, it is expected that the original boundary position $r^{(-)}_i = r^{(+)}_i$ is obtained with respect to many component codes. Therefore, even if the user IDs of all the colluders cannot be specified by appropriately combining $r^{(-)}_1, r^{(-)}_2, \ldots r^{(-)}_M, r^{(+)}_1, r^{(+)}_2, \ldots r^{(+)}_M$ obtained from the code detected from the target contents and performing verification, the user IDs of some of the colluders can be specified.

This is the basic idea of the stochastic tracing algorithm.

Meanwhile, if some residues selected from $r^{(-)}_1, r^{(-)}_2, \ldots r^{(-)}_M, r^{(+)}_1, r^{(+)}_2, \ldots r^{(+)}_M$ indicate a given user ID (if some selected residues indicate a part of the reference residue representation with respect to the identification information corresponding to a given user ID), the prior art tracing algorithm outputs it as a user ID of a colluder. However, if some selected residues do not actually belong to only one user but belong to a plurality of users, a user ID of a user who is not a colluder is accidentally output. Thus, in order to suppress the probability of such an erroneous detection, the number M of the component codes must be increased and used, and a code length is disadvantageously increased.

The prior art performs the stochastic tracing that tracing is correctly carried out with a given probability, whereas this embodiment enables the secured tracing instead of the stochastic tracing as to decoding of at least an outer code by contriving decoding processing of the outer code in the tracing algorithm by the decoding device 22 in the electronic watermark analysis apparatus 2, and enables reduction in the code length as compared with the prior art (reduction in the number M of the component codes).

The decoding device 22 of the electronic watermark analysis apparatus 2 according to this embodiment will now be described in detail hereinafter.

It is to be noted that, as described above, description will be given as to a case where the identification information is equal to the user ID here.

The component code is also referred to as an inner code and obtained by encoding each residue pair. The residue-pair representation is also referred to as an outer code and obtained by encoding the identification information or information concerning one or more sets of identification information included in a group of colluders although it cannot be said this is complete encoding.

Figure 11:
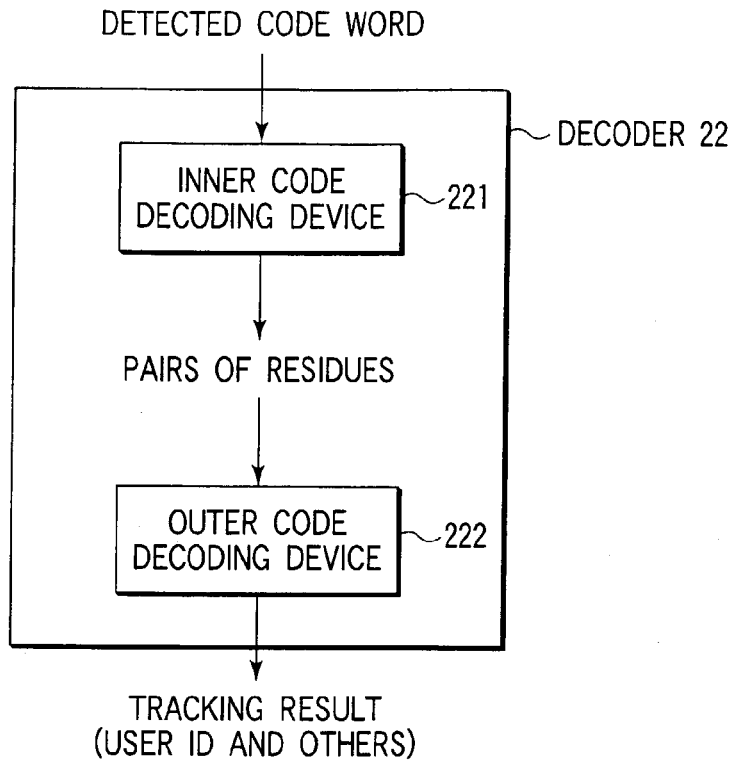
FIG. 11 is a view showing a structural example of a decoding device of the electronic watermark analysis apparatus according to the embodiment.

FIG. 11 shows a structural example of the encoding device 22 of the electronic watermark analysis apparatus 2 according to this embodiment.

As shown in FIG. 11, the decoding device 22 includes an inner code decoding device (residue-pair representation output circuit) 221 which inputs a code (an embedded collusion-secure code or a changed code under the collusion attack) read from contents as a detection target and outputs a set of residue pairs obtained from each component code W(i), namely, $r^{(-)}_i$, $r^{(+)}_i$ (i=1 to M), and an outer code decoding device 222 which outputs a tracing result.

The inner code decoding device 221 will be first described.

Figure 12:
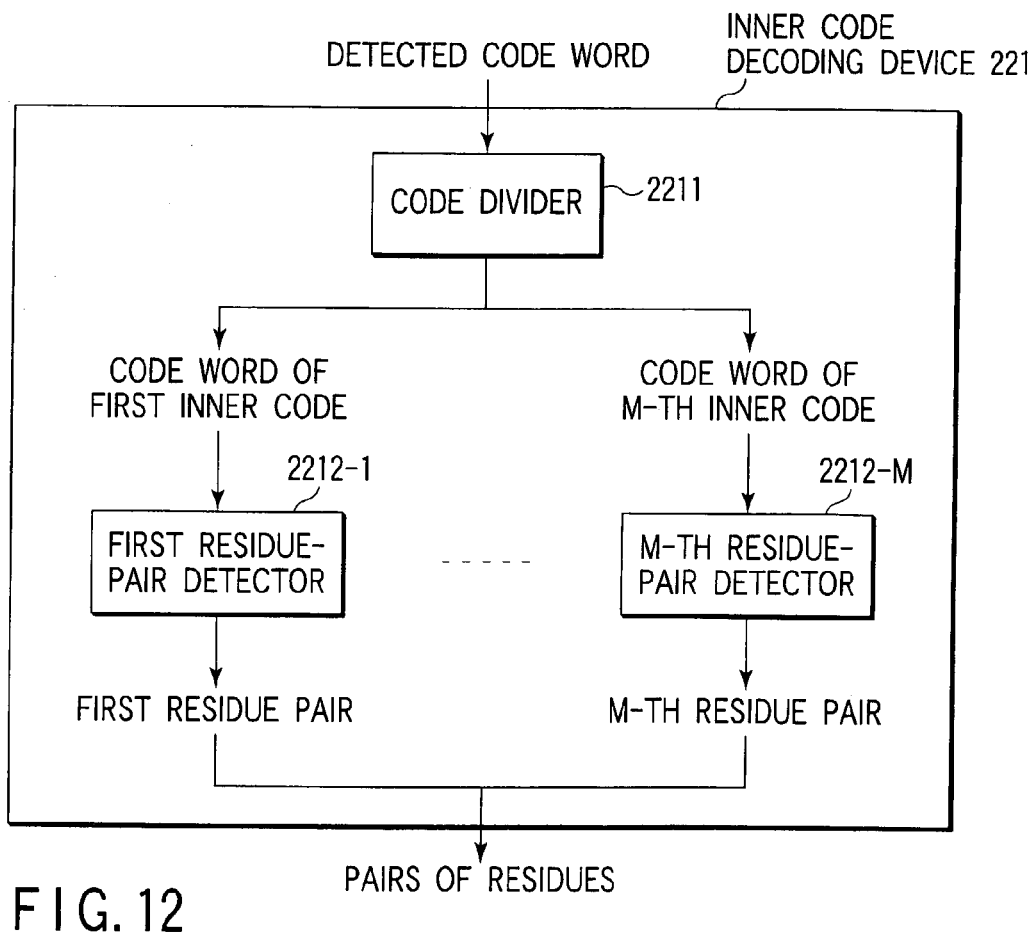
FIG. 12 is a view showing a structural example of an inner code decoding device of a decoding device according to the embodiment.

FIG. 12 shows a structural example of the inner code decoding device 221.

As shown in FIG. 12, the inner code decoding device 221 comprises a code divider 2211, and a plurality (M) of residue-pair detectors 2212-1 to 2212-M provided in accordance with the respective component codes W(1) to W(M).

Figure 13:
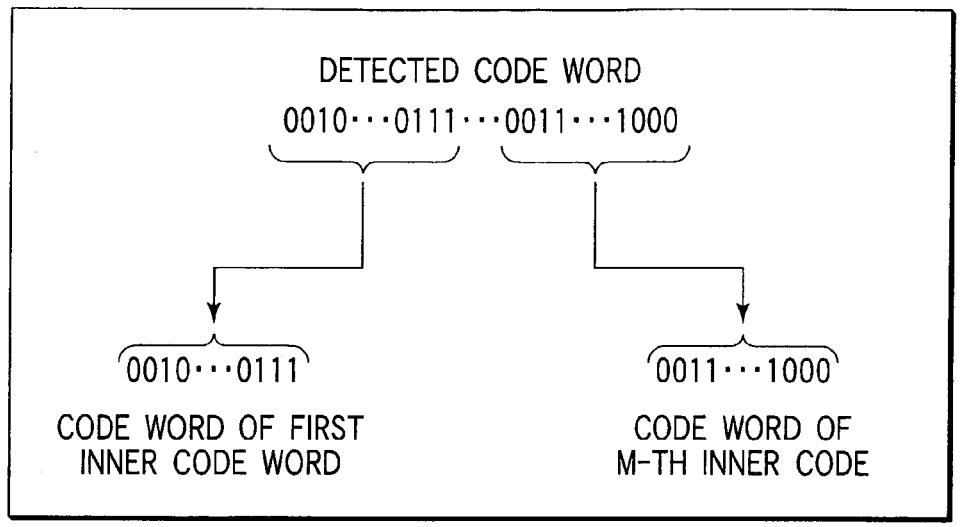
FIG. 13 is a view for illustrating processing of a code divider of the inner code decoding device according to the embodiment.

FIG. 13 shows a processing example of the code divider 2211 of the inner code decoding device 221.

As shown in FIG. 13, the code divider 2211 inputs a detected code and divides it into each component code (code word of the inner code) in accordance with a code length of each predetermined component code.

Assuming that n=N(i) in the $\Gamma_0(n, d)$ code, the code length of each component code W(i) is (N(i)−1)×d bits.

For example, like the above collusion attack example (example that the user having the user ID=2 and the user having the user ID=3 have performed the collusion attack in FIGS. 8 and 9; in the $\Gamma_0(n, d)$ code, the example of M=3, N(1)=3, N(2)=5, N(3)=7 and d=3), the following code is detected:

010101 000000010100 000000101111111111

In this case, (assuming that a code length of a first component code=(3−1)×3=6, a code length of a second component code=(5−1)×3=12, and a code length of a third component code=(7−1)×3=18 are know in advance), this detected code is divided as follows:

Component code $W(1)$ = 010101
Component code $W(2)$ = 000000010111
Component code $W(3)$ = 000000101111111111

The respective divided component codes W(1) to W(M) are supplied to the corresponding residue-pair detectors 2212-1 to 2212-M.

Figure 14:
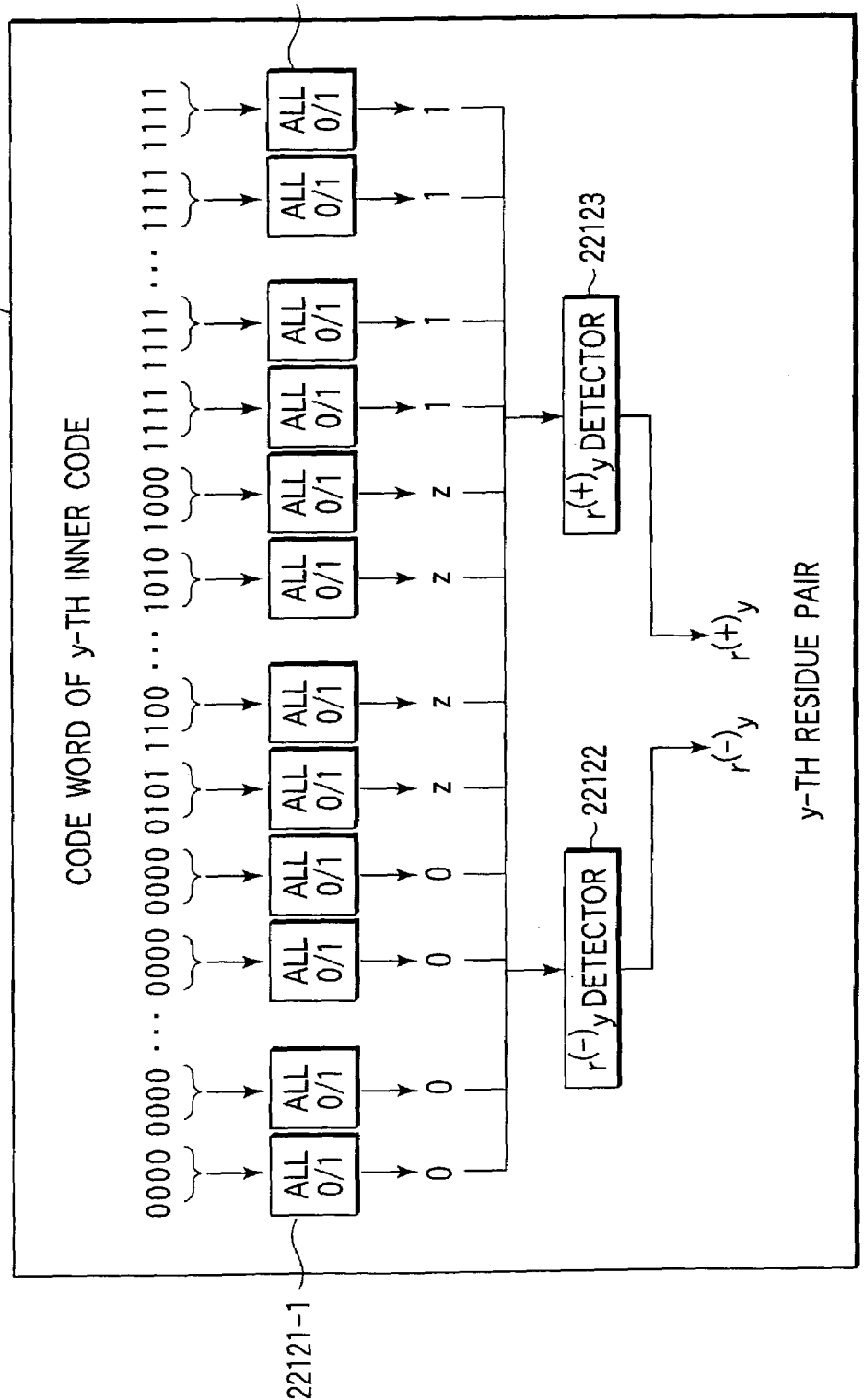
FIG. 14 is a view showing a structural example of a residue pair detector of the inner code decoding device according to the embodiment.

FIG. 14 shows a structural example of the y-th residue-pair detector 2212-y corresponding to the y-th component code W(y) of the inner code decoding device 221. It is to be noted that the i-th residue-pair detector 2212-y is written as a typical example but all of the residue-pair detectors 2212-1 to 2212-M have basically the same structure.

As shown in FIG. 14, the residue-pair detector 2212-y includes a plurality of (K=N(y)−1) determination sections 22121-1 to 22121-K corresponding to the respective blocks B(0), . . . B(N(y)−2) in units of d bits of the y-th component code W(y), a first boundary position detector 22122 which obtains a boundary position $r^{(-)}_y$, and a second boundary position detector 22123 which obtains a boundary position $r^{(+)}_y$.

The determination sections 22121-1 to 22121-K respectively determine whether all of d bits are 0 or all of d bits are 1 or none of them is applied (both 0 and 1 exist) with respect to a corresponding block formed of d bits in a given component code W(y).

The first boundary position detector 22122 obtains the above-described boundary position $r^{(-)}_y$ by making reference to outputs of the determination sections 22121-1 to 22121-K from the determination section 22121-1.

Likewise, the second boundary position detector 22123 obtains the boundary position $r^{(+)}_y$ by making reference to outputs of the determination sections 22121-1 to 22121-K from the determination section 22121-K.

A detected pair of $r^{(-)}_y$ and $r^{(+)}_y$ is a y-th residue pair.

For example, in the code example (M=3), the above-described W(1), W(2) and W(3) are respectively supplied to the first residue-pair detector 2212-1, the second residue-pair detector 2212-2 and the third residue-pair detector 2212-3, and the following can be respectively obtained:

The first residue pair $\{r^{(-)}_1, r^{(+)}_1\}=\{0, 2\}$
The second residue pair $\{r^{(-)}_2, r^{(+)}_2\}=\{2, 3\}$
The third residue pair $\{r^{(-)}_3, r^{(+)}_3\}=\{2, 3\}$ A set of the first residue par $r^{(-)}_1$ and $r^{(+)}_1$ to the M-th residue pair $r^{(-)}_M$ and $r^{(+)}_M$ obtained by the inner code decoding device 221 in this manner, namely, the residue-pair representation is supplied to the outer code decoding device 222.

Description will now be given as to the outer code decoding device 222 of the decoding device 22 of the electronic watermark analysis apparatus 2.

Figure 15:
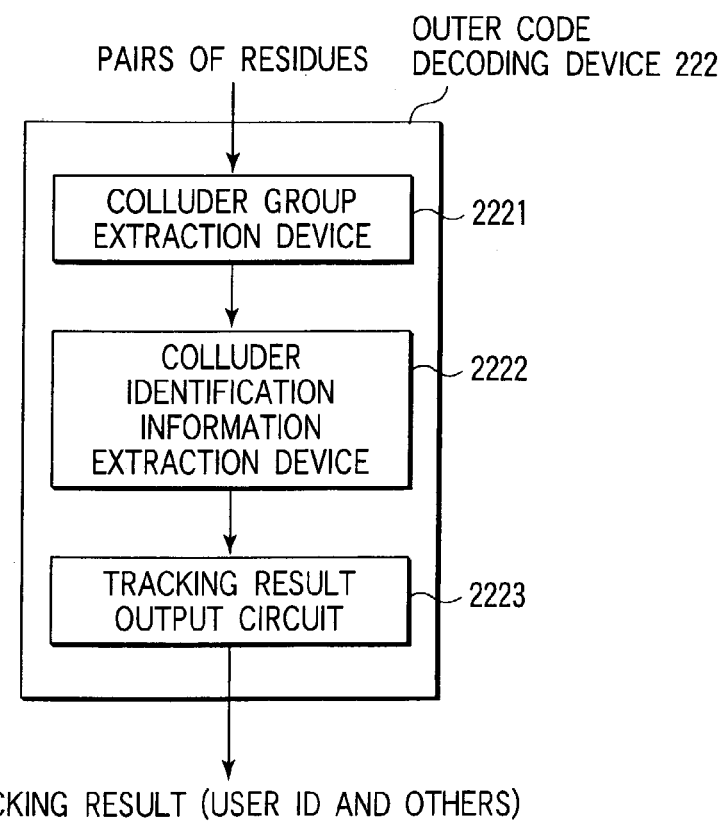
FIG. 15 is a view showing a structural example of an outer code decoding device of the decoding device according to the embodiment.

FIG. 15 shows a structural example of the outer code decoding device 222.

As shown in FIG. 15, the outer code decoding device 222 includes a colluder group extraction circuit 2221, a colluder identification information extraction circuit 2222 and a tracing result output circuit 2223.

Here, in the tracing algorithm, a maximum collusion number when the collusion attack is carried out is assumed as c. That is, consideration is given as to a case where the collusion attack is carried out by an arbitrary number a of colluders satisfying 2≦a≦c, i.e., copies of contents in which a sets of different identification information are embedded. It is to be noted that consideration is given provided that the user and the identification information have the one-to-one relationship in this example. However, for example, when the user and the identification information can have the one-to-many relationship and the same colluder subjects two copies of the same contents in which two sets of identification information corresponding to him/herself are embedded to the collusion attack, consideration is given in accordance with each copy of the contents having embedded therein sets of the identification information whose number is different from the number of colluders.

An identification information group formed by the respective sets of identification information embedded in a plurality of copies of the contents which is supplied when performing the collusion attack based on a plurality of the copies of the contents having a ($2 \leq a \leq c$) sets of identification information different from each other embedded therein will be referred to as a colluder group hereinafter. For instance, in the example of FIGS. 8 and 9, since the identification information is equal to the user ID (=0 to 14), assuming that the maximum collusion number c equal to 3 (it is to be noted that a range of the identification range or the maximum collusion number will actually take a larger number), the colluder groups are {0, 1}, {0, 2}, ... {0, 14}, {1, 1}, {1, 2}, ... {1, 14}, {2, 3}, ... {2, 14}, {3, 4}, ... {11, 14}, {12, 13}, {12, 14}, {13, 14} (these are collusions based on a=2), {0, 1, 2}1, {0, 1, 3}, ... {0, 1, 14}, {0, 2, 3}, {0, 2, 4}, ... {0, 2, 14}, {0, 3, 4}, ... {10, 11, 14}, {11, 12, 13}, {11, 12, 14}, {12, 13, 14} (these are collusions based on a=3). The collusion attacked with the maximum collusion number c which is not more than 3 is carried out by any of the above-described colluder groups.

Then, the colluder group extraction circuit 2221 inputs a set of the residue pairs obtained from the respective component codes W(1) to W(M) of the detected code, namely, the following residue-pair representation:

$$r_1^{(-)}, r_1^{(+)}, r_2^{(-)}, r_2^{(+)}, \ldots r_M^{(-)}, r_M^{(+)}$$

Also, it outputs a colluder group which matches with this representation.

Here, a given colluder group matches with the target residue-pair representation in the following case. That is, the reference residue representation ($r^{(0)}_1, r^{(0)}_2, \ldots r^{(0)}_M$) corresponding to each of a plurality of sets of identification information forming that colluder group are compared with those corresponding the same component code W(i) (for example, comparing $r^{(0)}_1$ corresponding to each identification information with respect to W(1)), and a maximum value of the reference residue in the component code W(i) is represented as max($r^{(0)}_i$) while a minimum value is represented as min($r^{(0)}_i$). In this case, if $r^{(-)}_1=\min(r^{(0)}_i)$, $r^{(+)}_1=\max(r^{(0)}_i)$, $r^{(-)}_2=\min(r^{(0)}_2)$, $r^{(+)}_2=\max(r^{(0)}_2)$, ... $r^{(-)}_M=\min(r^{(0)}_M)$, $r^{(+)}_M=\max(r^{(+)}_M)$ can be achieved with respect to all of target residue-pair representations $r^{(-)}_1, r^{(+)}_1, r^{(-)}_2, r^{(+)}_2, \ldots r^{(-)}_M$ and $r^{(+)}_M$, it can be determined that the given colluder group matches with the target residue pair representation.

The number of the colluder groups obtained by the colluder group extraction circuit 2221 can be one or more depending on the contents of the residue-pair expressions.

It is to be noted that the judgment of matching may be performed by the above-described processing but it may be also carried out by preparing a table indicative of the relationship of the residue-pair representation and one or a plurality of the colluder groups matching with the residue-pair representation and making reference to this table. Further, the identification information may be obtained by preparing a table indicative of the relationship between the residue-pair representation and a plurality of sets of identification information forming one colluder group matching with the residue-pair representation, or one or a plurality of sets of information existing commonly in a plurality of the colluder groups matching with the residue-pair representation, or information indicating that there is no such identification information, and making reference to this table. In this case, the following colluder identification information extraction circuit 2222 is no longer required.

Meanwhile, when $r^{(-)}_1=r^{(+)}_1, r^{(-)}_2=r^{(+)}_2, \ldots r^{(-)}_M=r^{(+)}_M$ can be achieved with respect to all residues of the supplied residue-pair representation, there has been no collusion attack. In this case, the identification information specified by the reference residue representation $r^{(0)}_1, r^{(0)}_2, \ldots r^{(0)}_M$ by which $r^{(-)}_1=r^{(+)}_1=r^{(0)}_1, r^{(-)}_2=r^{(+)}_2=r^{(0)}_2, r^{(-)}_M=r^{(+)}_M=r^{(0)}_M$ can be achieved is embedded in the contents. In this case, supplying information indicating that there has been no collusion attack, or information indicating that there has been no collusion attack and the detected identification information to the tracing result output circuit 2223.

Incidentally, for example, at first, it is possible to determine whether $r^{(-)}_1=r^{(+)}_1, r^{(-)}_2=r^{(+)}_2, \ldots r^{(-)}_M=r^{(+)}_M$ can be achieved with respect to all residues in the supplied residue pair expression, and the judgment on matching may be carried out if this cannot be achieved. Alternatively, for example, when the method of making reference to the table is adopted as described above, the relationship between the residue pair expression and the identification information at that moment that $r^{(-)}_1=r^{(+)}_1, r^{(-)}_2=r^{(+)}_2, \ldots r^{(-)}_M=r^{(+)}_M$ can be achieved may be also registered in the table, and processing using the table may be enabled irrespective of whether $r^{(-)}_1=r^{(+)}_1, r^{(-)}_2=r^{(+)}_2, \ldots r^{(-)}_M=r^{(+)}_M$ can be achieved.

Furthermore, when $r^{(-)}_1=r^{(+)}_1, r^{(-)}_2=r^{(+)}_2, \ldots r^{(-)}_M=r^{(+)}_M$ cannot be achieved for some reason and the colluder group matching with the supplied residue-pair representation cannot be obtained, or when $r^{(-)}_1=r^{(+)}_1, r^{(-)}_2=r^{(+)}_2, \ldots r^{(-)}_M=r^{(+)}_M$ can be achieved and the identification information which must be embedded in the contents cannot be obtained, a result is an error. In this case, it is sufficient to supply information indicative of the error to the tracing result output circuit 2223.

It is to be noted that information required for the tracing algorithm such as a range of the identification information to be used, the maximum collusion number c, or the reference residue representation corresponding to each identification information (or information used to obtain this reference residue representation (for example, N(i)) may be input from the output side when carrying out tracing, or may be stored in advance. Incidentally, when the information used to obtain the reference residue representation corresponding to each identification information is stored in advance, the reference residue representation may be obtained every time tracing is carried out, or a once calculated value may be stored.

Then, the colluder identification information expression portion 2222 extracts identification information of the colluders who might have actually participated in the collusion attack based on the colluder group obtained by the colluder group extraction circuit 2221.

When only one colluder group is obtained by the colluder group extraction circuit 2221, all the identification information included in the colluder group is supplied to the tracing result output circuit 2223 as identification information of the colluders. It is to be noted that information which specifies the colluder group or the residue-pair representation may be also output in addition to the obtained identification information.

When two or more colluder groups are obtained by the colluder group extraction circuit 2221, only one or a plurality of sets of identification information which is commonly included in all the obtained colluder groups are supplied to the tracing result output circuit 2223 as the identification information of the colluders. It is to be noted that this identification information which is commonly included in all the obtained colluder groups is referred to as common identification information.

Incidentally, if two or more colluder groups are obtained by the colluder group extraction circuit 2221 and the common identification information exists, information which specifies the colluder groups or the residue-pair representation may be also output in addition to the obtained common identification information.

However, even if two or more colluder groups are obtained by the colluder group extraction circuit 2221 but there is no common identification information, supplying information indicating that there is no common identification information (or information which indicates that there is no common identification information and information which specifies the obtained colluder groups, or information which indicates that there is no common identification information and the obtained residue-pair representation) to the tracing result output circuit 223 can suffice. Incidentally, as will be described later, when a case that the common identification information does not exist in a plurality of the obtained colluder groups is theoretically prevented from being generated, the case that the common identification information does not exist in a plurality of the common colluder groups is generated only due to an error.

The tracing result output circuit 2223 outputs a tracing result including the information supplied from the colluder group extraction circuit 2221 or the colluder identification information extraction circuit 2222.

For example, the tracing result includes the identification information of one or a plurality of colluders which might have participated in the collusion attack when the collusion attack is detected, or information indicating that the collusion attack is detected but the common identification information cannot be obtained (or information which indicates the same and information which specifies the colluder group, or information indicating the same and the residue-pair representation), or information indicating that there has been no collusion attack (or information indicating that there has been no collusion attack and the detected identification information) or information indicating that a result is an error.

The tracing algorithm by the outer code decoding device 222 according to this embodiment will now be described by using a simplified concrete example in which small numeric figures are used.

At first, it is assumed that the number M of integers is 4 and N(1)=2, N(2)=3, (N)3=5, N(4)=7. Moreover, although N(1)×N(2)×N(3)×N(4)−1=210, 0 to 5 in this expression are used as identification information (namely, user IDs as an example).

FIG. 16 shows a reference residue representation $r^{(0)}_1$ (=A(1)), $r^{(0)}_2$ (=A(2)), $r^{(0)}_3$ (=A(3)), $r^{(0)}_4$ (=A(4)) obtained with respect to each identification information (user IDs=0 to 5) in this example.

A collusion-secure code corresponding to the corresponding reference residue representation in FIG. 16 is embedded in each of copies of contents provided to users corresponding to the user IDs=0 to 5.

Here, as a result of carrying out the collusion attack by any two or three of a copy of the contents having the user ID=0 embedded therein as the identification information, a copy of the contents having the user ID=1 embedded therein, a copy of the contents having the user ID=2 embedded therein, a copy of the contents having the user ID=3 embedded therein, a copy of the contents having the user ID=4 embedded therein, and a copy of the contents having the user ID=5 embedded therein, such a residue-pair representation as shown in FIG. 17A is obtained from the copy of the contents generated by the collusion attack.

In this case, only the colluder group formed by the user ID=2 and the user ID=3 such as shown in FIG. 17B matches with the residue-pair representation illustrated in FIG. 17A (only the colluder group can be obtained).

Incidentally, in FIG. 17B, a circle indicates a minimum value in the reference residue of each user ID which has given the residue $r^{(-)}_i$ with the component code i, and a square indicates a maximum value in the reference residue of each user ID which has given the residue $r^{(+)}_i$ with the component code i.

When only the one colluder group is obtained in this manner, all the user IDs forming the colluder group are the user IDs (identification information) of the colluders which might have actually participated in the collusion attack.

Further, as another example, it is assumed that such a residue-pair representation as shown in FIG. 18A is obtained.

In this case, only the colluder group formed by the user ID=2, the user ID=3 and the user ID=4 such as shown in FIG. 18B matches with the residue-pair representation shown in FIG. 18A (only the colluder group is obtained).

In FIG. 18B, it is to be noted that the circle and the square indicate the same meanings as those in FIG. 17B. Although giving $r^{(+)}_1$ indicates the reference residue of the ID=3 in FIG. 18B, it is the same as the reference residue of the ID=5. This point is also the same with respect to $r^{(+)}_2$.

Since this is also the case that only one colluder group is obtained, all the user IDs forming the colluder group are the user IDs (identification information) of the colluders who might have actually participated in the collusion attack.

On the other hand, it is assumed that such a residue-pair representation as shown in FIG. 19A is obtained.

In this case, such a colluder group #1 formed by the user ID=0, the user ID=1 and the user ID=4 as shown in FIG. 19B and a colluder group #2 formed by the user ID=0, the user ID=3 and the user ID=4 as shown in FIG. 19C are suitable for the residue-pair representation in FIG. 19A (the two colluder groups can be obtained).

In FIGS. 19B and 19C, it is to be noted that the circle and the square indicate the same meanings as those in FIG. 17B. However, in FIG. 19B, $r^{(-)}_1$ is given as the reference residue of the ID=0, but it is also the same as the reference residue of the ID=4. This point can be also applied with respect to $r^{(+)}_2$ in FIG. 19B and $r^{(-)}_1$ and $r^{(-)}_2$ in FIG. 19(c).

When a plurality of colluder groups are obtained from the same residue-pair representation in this manner, it is hard to be aware of which colluder group corresponds to the user IDs (identification information) of the colluders who might have actually participated in the collusion attack from only the residue-pair representation.

However, if the collusion attack is carried out with the colluder number which is not more than the maximum colluder number, any one colluder group of these colluders is a colluder group to be obtained.

Therefore, if there is the identification information which exists commonly in all of a plurality of the obtained colluder groups, at least that identification information (namely, the common identification information) is the identification information of the colluders who might have actually participated in the colluder attack.

Therefore, in this example, the user ID=0 and the user ID=4 which exist commonly in the colluder group #1 shown in FIG. 19B and the colluder group #2 shown in FIG. 19C are the user IDs (identification information) of the colluders who might have actually participated in the collusion attack.

Even if it is impossible to be aware of all the colluders who might have actually participated in the collusion attack, assuredly realizing even one colluder possesses great significance for the pre-suppression of illegal copy of digital contents or the post-relief when violation of copyright occurs.

Meanwhile, in case of allowing theoretical occurrence of a case where a plurality of colluder groups are obtained but there is no common identification information, occurrence of such a case means that no identification information of colluders who might have actually participated in the collusion attack cannot be obtained at all. However, if the collusion attack has been carried out with the colluder number which is not more than the maximum colluder number, any one colluder group of these colluders is a colluder group to be obtained. Therefore, even in such a case, it can be considered that storing information of a plurality of the obtained colluder groups can serve as any reference.

However, it is desirable to suppress the cases that a plurality of the colluder groups are obtained but there is no common identification information as low as possible. Moreover, such cases can be reduced by any means.

For example, there is one method by which such a case as that a plurality of the colluder groups are obtained but there is no common identification information is searched and all or a part of the identification information forming such colluder groups is prevented from being used.

In addition, for example, by determining an assumed maximum colluder number c to be fixed, the above-described cases can be qualitatively reduced by increasing the number M (=number of component codes) of the integers or reducing a range of the identification information to be used. It is to be noted that the example shown in FIG. 16 corresponds to the example where the above-described cases are all eliminated.

Additionally, the present inventor has discovered a method by which one or a plurality of sets of common identification information (theoretically) necessarily exist by constraining a definite condition between the maximum colluder number c, the number M (=number of component codes) of the integers and a range (determined as serial numbers starting from 0) of the identification information to be used when a plurality of colluder groups are obtained (that is, the above-described cases are all eliminated in theory). This point will be described later in detail.

Meanwhile, some procedure examples of the tracing algorithm according to this embodiment will be described hereinafter. It is to be noted that many variations of the concrete procedure of the tracing algorithm are possible and the procedure is not restricted to the following.

PROCEDURE EXAMPLE 1

Figure 20:
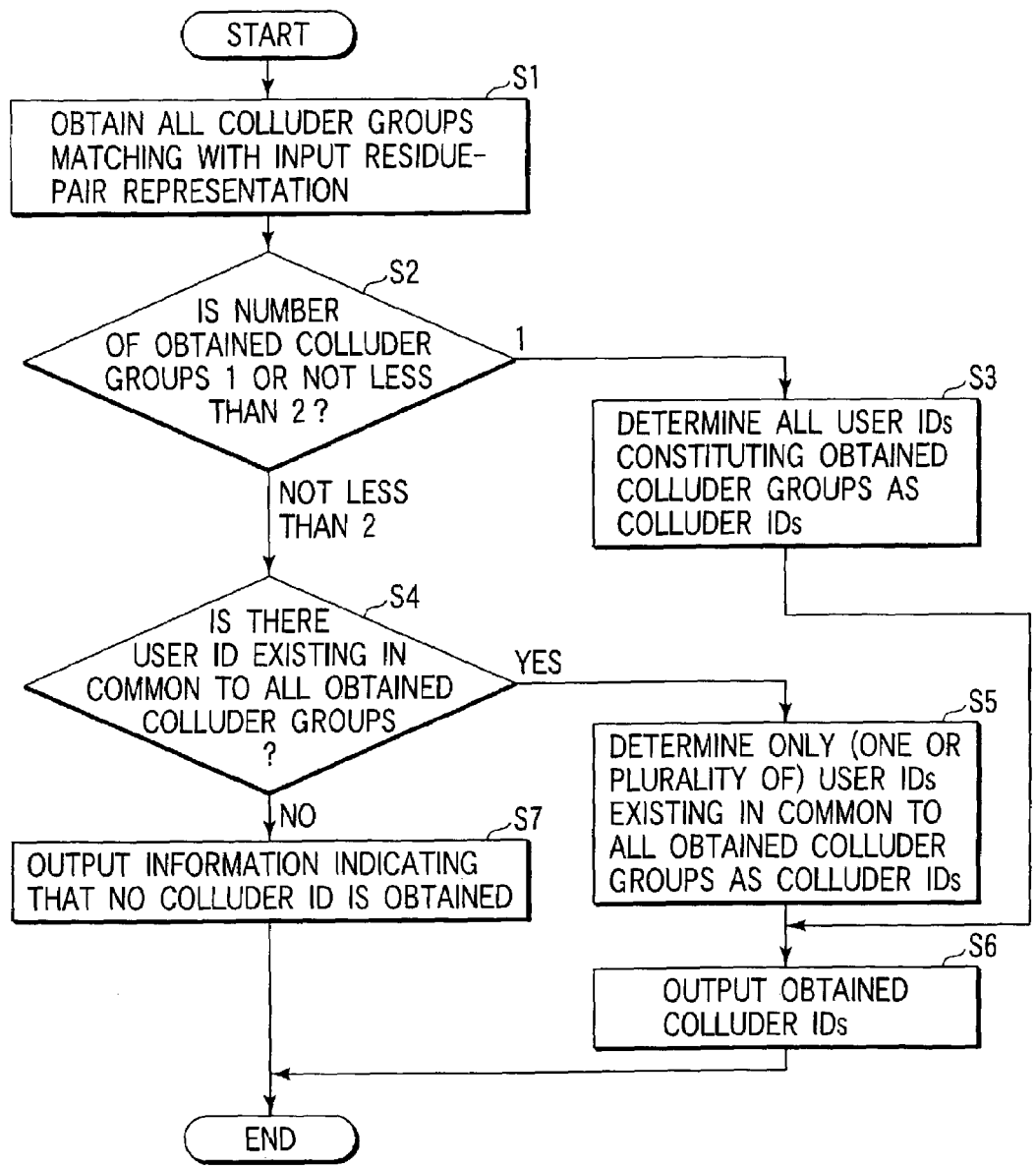
FIG. 20 is a flowchart showing an example of a tracing algorithm of the outer code decoding device of the decoding device according to the embodiment.

FIG. 20 shows an example of the tracing algorithm of the outer code decoding device 222 of the decoding device 22 according to this embodiment.

It is to be noted that consideration is given as to a case where at least one of $r^{(-)}_1 = r^{(+)}_1, r^{(-)}_2 = r^{(+)}_2, \ldots r^{(-)}_M = r^{(+)}_M$ cannot be achieved in the given residue-pair representation here.

All the colluder groups matching with the given residue-pair representation are first obtained (step S1).

If the number of the obtained colluder groups is 1 (step S2), all the user IDs forming the obtained colluder group are acquired as the user IDs of the colluders (colluder IDs) (step S3), and the obtained colluder IDs are output (step S6).

In cases where the number of the obtained colluder groups is not less than 2 (step S2), if there is a user ID which exist commonly in all the obtained colluder groups (step S4), only (one or a plurality of) user ID which exists commonly in all the obtained colluder groups is acquired as the colluder ID (step S5), and the obtained colluder ID is output (step S6). On the other hand, if there is no user ID which exists commonly in all the obtained colluder groups (step S4), information indicating that the colluder ID is not obtained (or information which indicates the same and specifies the colluder groups, or information which indicates the same and the residue-pair representation) is output (step S7).

It is to be noted that a result is error if no colluder group is obtained at step S2.

Figure 21:
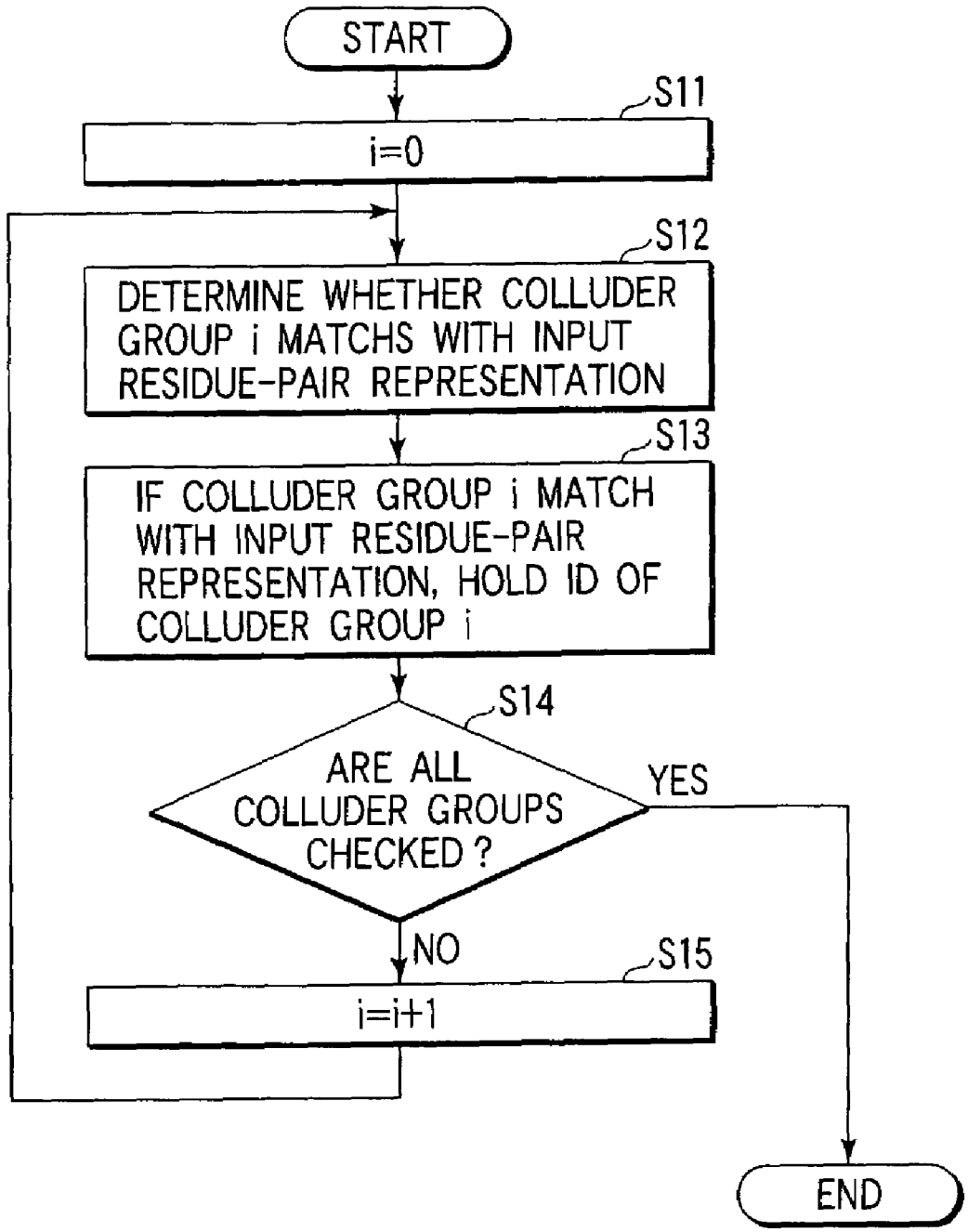
FIG. 21 is a flowchart showing an example of a processing procedure at step S1 illustrated in FIG. 20.

FIG. 21 shows an example of the processing procedure of step S1.

It is to be noted that serial numbers from 0 are given to all the target colluder groups as the colluder group IDs.

At first, it is determined that i=0 (step S11).

Whether the colluder group i matches with the given residue-pair representation is examined (step S12). Then, if the colluder group i matches with the residue-pair representation, the ID=0 of the colluder group i is held (step S13).

Then, i is incremented by 1 (step S15), whether the colluder group i matches with the given residue-pair representation is examined (step S12), and the ID=0 of the colluder group i is held if the colluder group i matches with the given residue-pair representation (step S13).

The similar processing is thereafter carried out with respect to all the colluder groups (steps S14 and S15).

Incidentally, if the total number of the user IDs is large, since performing this processing to all the colluder groups requires large cost, this processing may be carried out to only restricted colluder groups depending on, e.g., a condition concerning the size of the colluder group or a condition that the probability of breaking by the current collusion attack can be considered to be very low.

PROCEDURE EXAMPLE 2

Figure 22:
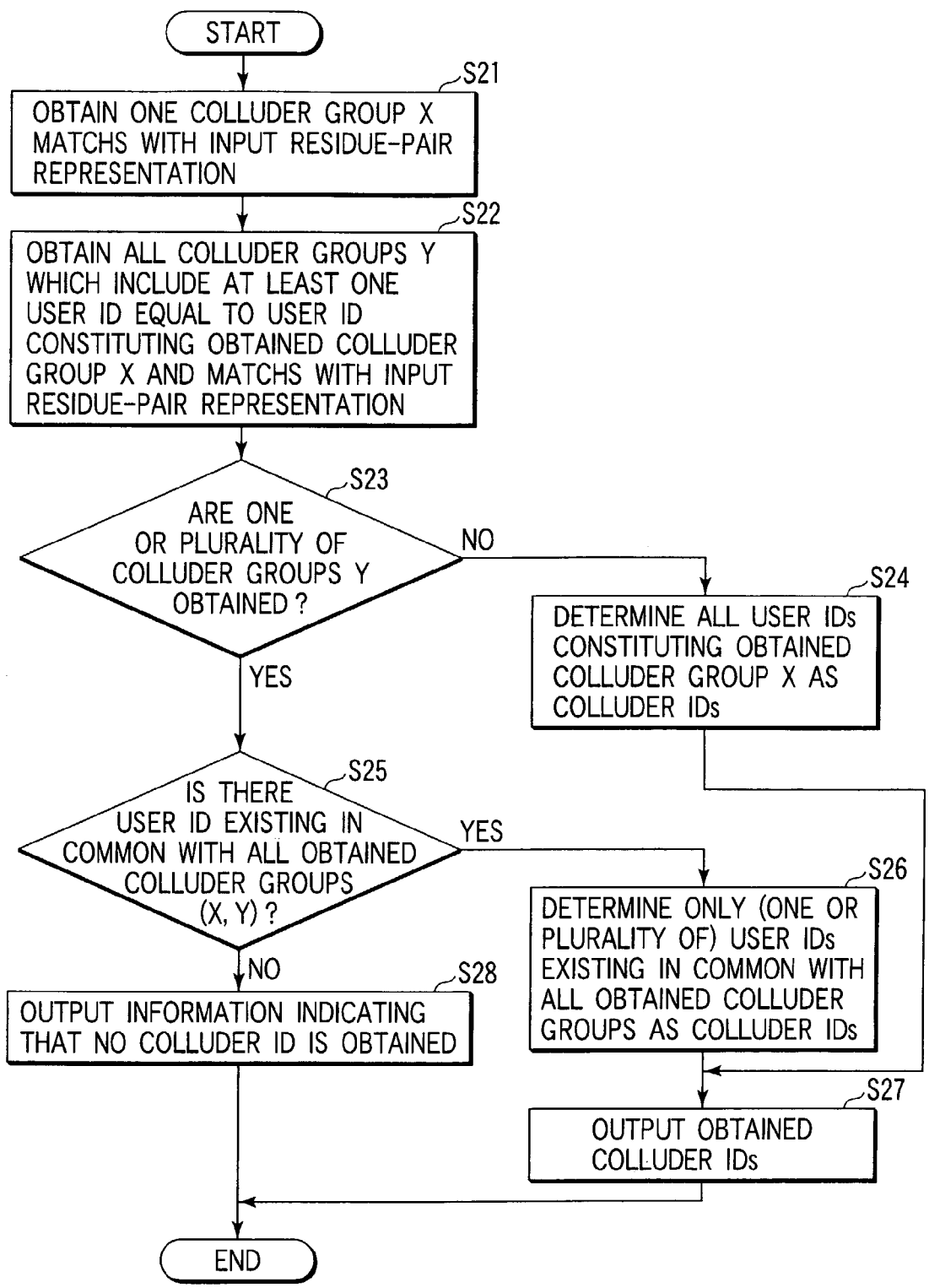
FIG. 22 is a flowchart showing another example of the tracing algorithm of the outer code decoding device of the decoding device according to the embodiment.

FIG. 22 shows another example of the tracing algorithm of the outer code decoding device 222 of the decoding device 22 according to this embodiment.

It is to be noted that consideration is given as to a case where at least one of $r^{(-)}_1 = r^{(+)}_1, r^{(-)}_2 = r^{(+)}_2, \ldots r^{(-)}_M = r^{(+)}_M$ cannot be achieved in the given residue-pair representation here.

One colluder group X suitable for the given residue-pair representation is first obtained (step S21).

Then, all the colluder groups Y ($Y_1, Y_2, Y_3, \ldots$) which include at least the one same user ID as the user ID forming the obtained colluder group X and are suitable for the given residue-pair representation are obtained (step S22).

If no colluder group is obtained (step S23), all the user IDs forming the obtained colluder groups Y are determined as the colluder IDs (step S24), and the obtained colluder IDs are output (step S27).

In cases where one or a plurality of the colluder groups Y are obtained (step S23), if there is a user ID which exists commonly in all the obtained colluder groups (X, $Y_1$, $Y_2$, $Y_3$, ... ) (step S25), only one or a plurality of the user IDs which exist commonly in all the obtained colluder groups are determined as colluder IDs (step S26), and the obtained colluder IDs are output (step S27). On the other hand, if there is no user ID which exists commonly in all the obtained colluder groups (X, $Y_1$, $Y_2$, $Y_3$, ... ) (step S25), information indicating that no colluder ID is obtained (or information which indicates the same and specifies the colluder group, or information indicating the same and the residue-pair representation) is output (step S28).

It is to be noted that a result is an error when no colluder group is obtained at step S21. Alternatively, a modification may be given in such a manner that information indicating that no colluder ID is obtained is output and the processing is terminated when this error occurs.

Figure 23:
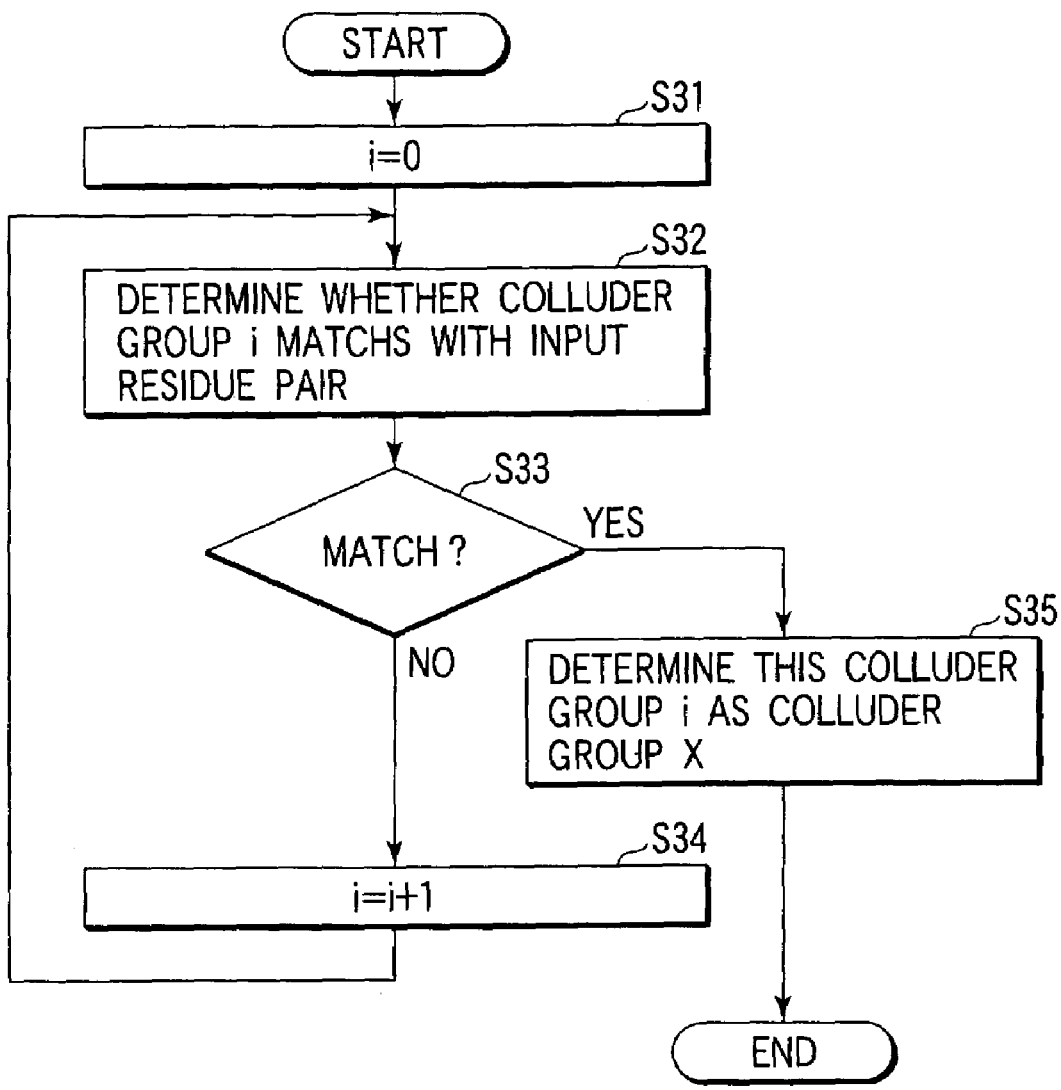
FIG. 23 is a flowchart showing an example of a processing procedure at step S21 illustrated in FIG. 22.

FIG. 23 shows an example of the processing procedure of step S21, and FIG. 24 shows an example of the processing procedure of step S22.

It is to be noted that serial numbers starting from 0 are given to all the target colluder groups as colluder group IDs.

i is incremented by 1 sequentially from i=0 (steps S31 and S34), whether the colluder group i matches with the residue-pair representation is examined (step S32), and the colluder group i suitable for the residue-pair representation which is found at first (step S33) is determined as a colluder group X (step S35).

Subsequently, i is incremented by 1 sequentially from the colluder group i=X+1 following the colluder group X obtained by the procedure of FIG. 23 (steps S41 and S45), and the following procedure is carried out with respect to each colluder group i (step S44). It is to be noted that j=0 (step S41). At step S34, when there is no colluder group corresponding to next i, an error is output and the processing is terminated.

When the colluder group i does not include the same user ID as the user ID forming the colluder group X at all, the processing advances to the next colluder group (steps S42 and S45).

When the colluder group i includes at least one user ID equal to the user ID forming the colluder group i (step S42), whether the colluder group i matches with the given residue pair is checked. If they are matched, the colluder group i is determined as a colluder group $Y_j$ and j is incremented by 1 (step S43).

PROCEDURE EXAMPLE 3

Figure 25:
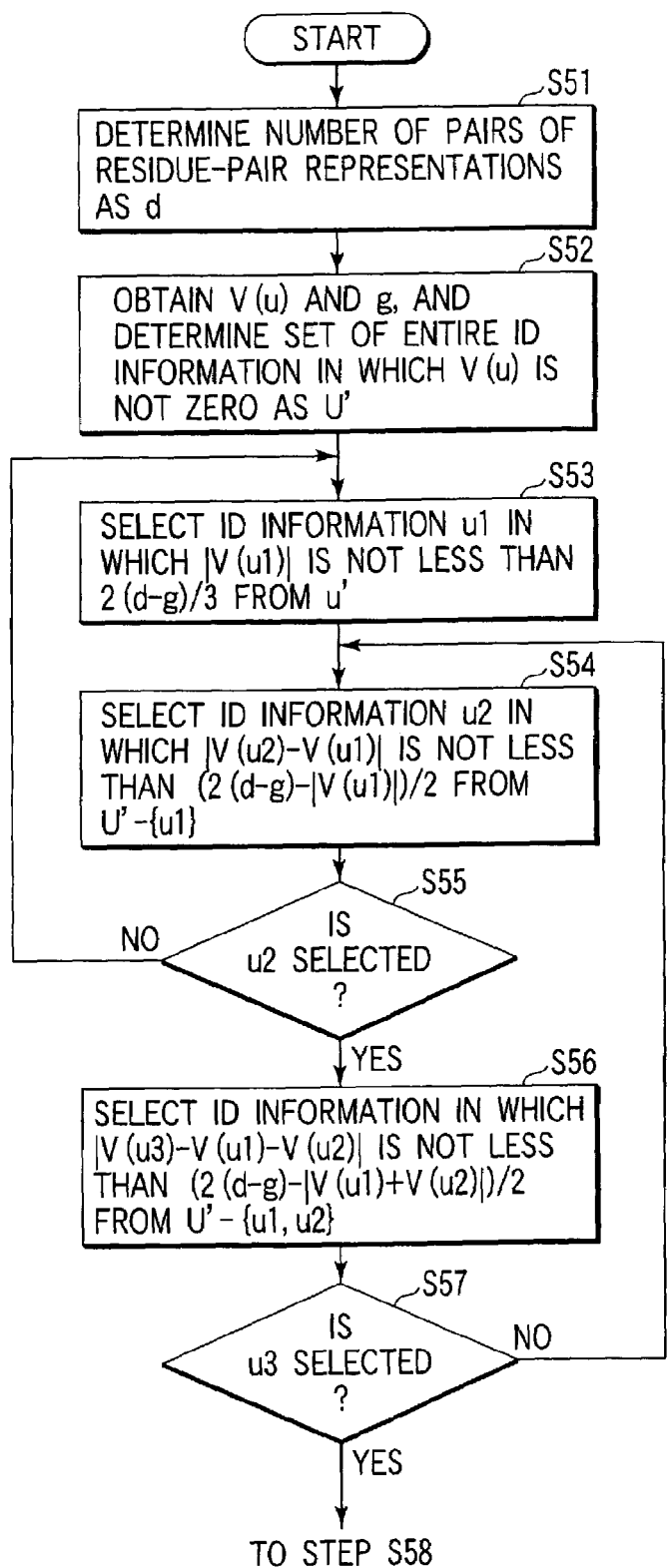
FIG. 25 is a flowchart showing a first half of still another example of the tracing algorithm of the outer code decoding device of the decoding device according to the embodiment.
Figure 26:
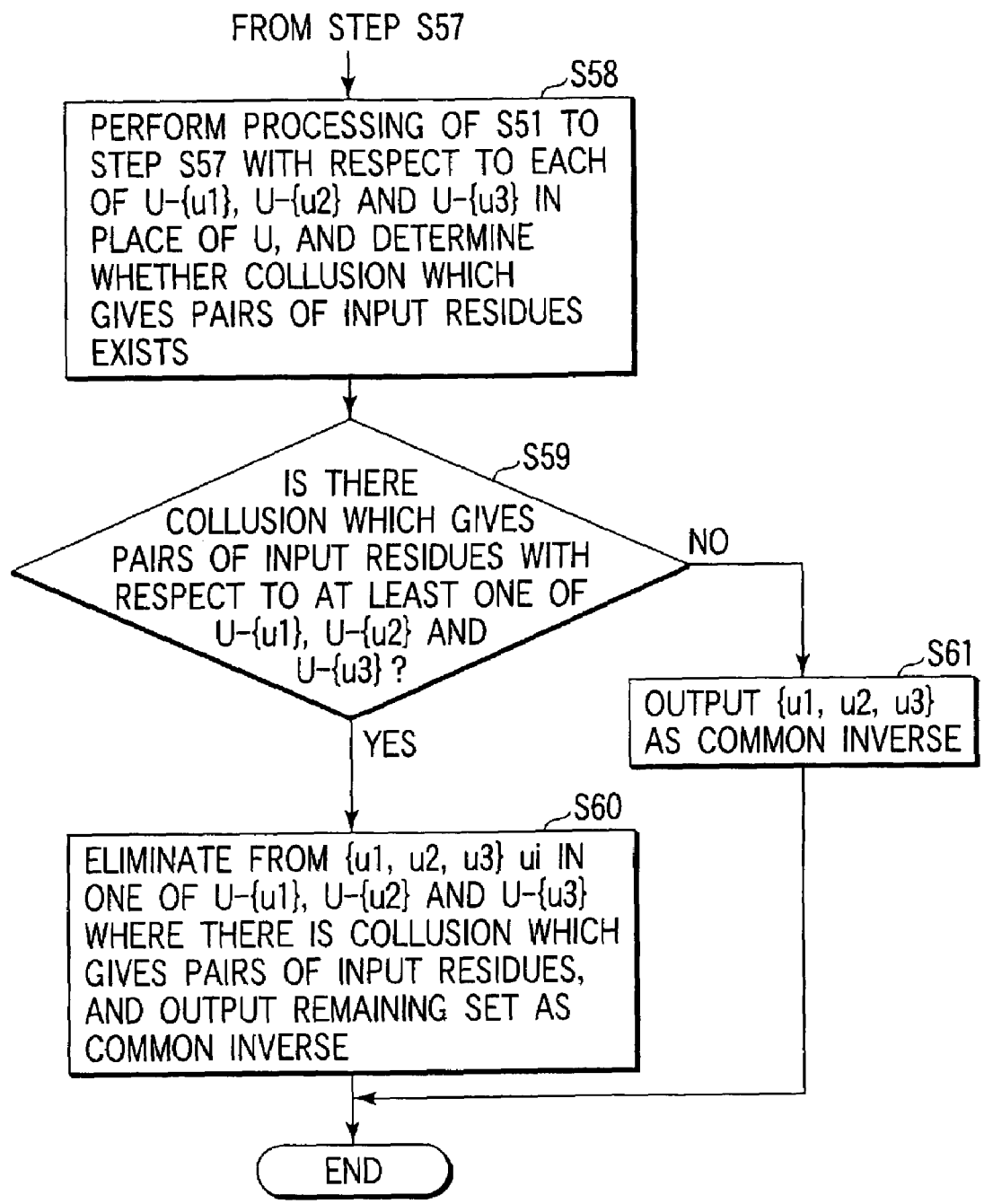
FIG. 26 is a flowchart showing a last half of still another example of the tracing algorithm of the outer CODE decoding device of the decoding device according to the embodiment.

FIGS. 25 and 26 show still another example of the tracing algorithm of the outer code decoding device 222 of the decoding device 22 according to this embodiment.

It is to be noted that FIGS. 25 and 26 show an example when the maximum collusion number c=3.

The number of the residue pairs of the residue-pair representation is determined as d (M in the above description) (step S51).

With respect to all sets of identification information u, the number of the residue pairs that u is congruent to the maximum residue or the minimum residue between u and the residue-pair representation is determined as V(u) (step S52). However, if even one pair such that the residue of u is larger than the maximum residue or smaller than the minimum residue exists, V(u)=0 is determined. Further, a set of the entire identification information where V(u) is not zero is determined as U' (step S52).

It is to be noted that g indicates the number of pairs that the maximum residue and the minimum residue match in a set of the residue pairs.

Since it is required to create all of 2(d−g) residues included in the set of residue pairs from up to three sets of the identification information joined to collusion, the identification information u1 that |V(u1)| residues is not less than 2(d−g)/3 is selected from U' (step S53).

Since it is required to create all of the remaining 2(d−g)−|V(u1)| residues obtained by subtracting |V(u1)| created by u1 from 2(d−g) residues included in the sets of the identification information by using up to two sets of the identification information joined to the collusion, the identification information u2 that |V(u2)−V(u1)| is not less than (2(d−g)−|V(u1)|)/2 is then selected from U'−{u1} (step S54).

If there is no appropriate u2 (step S55), the processing is returned to step S53, and new u1 is selected.

Since it is required to create all of the remaining 2(d−g)−|V(u1)+V(u2)| residues obtained by subtracting |V(u1)+V(u2)| residues created by u1 and u2 from 2(d−g) residues included in the sets of identification information by using up to one set of identification information joined to the collusion, the identification information u3 that |V(u3)−V(u1)−V(u2)| is not less than (2(d−g)−|V(u1)+V(u2)|) is then selected from U'−{u1, u2} (step S56).

When there is no appropriate u3 (step S57), the processing is returned to step S54, and the new u2 is selected.

{u1, u2, u3} obtained at steps up to step S57 is the collusion which provides the given residue-pair representation. Thus, in order to determine whether the respective elements u1, u2 and u3 are included in the common inverse (common identification information), the processing from step S51 to step S57 is performed to each of U−{u1}, U−{u2} and U−{u3} instead of U, and whether the collusion which provides the given residue-pair representation exists is checked.

At step S58, if there is no collusion which provides the given residue-pair representation with respect to U−{ui} (step S59), all of u1, u2, and u3 are determined as the colluder IDs and {u1, u2, u3} is output as a common inverse (step S61).

If there is a collusion which provides the given residue-pair representation with respect to U−{ui} at step S58 (step S59), it is determined that such ui is not included in the common inverse (common identification information) and this ui is eliminated from {u1, u2, u3}. Also, the common inverse (common identification information) which is a remaining set is output as a collusion (step S60).

It is to be noted that FIGS. 25 and 26 show the case where the maximum collusion number c=3, but the procedure when the maximum collusion number c is not less than 4 can be likewise carried out.

Incidentally, description has been mainly given as to the case where the identification information=the user ID and the user ID is output as a tracing result in the above, but the following many variations can be carried out with respect to the conformation of the tracing result output circuit 2223 of the outer code decoding device 222 of the decoding device 22 when the identification information≠the user ID.

The identification information is obtained as a tracing result, a user ID is acquired from the obtained identification information, and the user ID is output.

The identification information is obtained as a tracing result, and the obtained identification information is output (a user ID is acquired outside from the identification information according to needs).

The identification information is obtained as a tracing result, a copy ID is acquired from the obtained identification information, a user ID is obtained from the copy ID, and the user ID is output.

The identification information is obtained as a tracing result, a copy ID is acquired from the obtained identification information, and the copy ID is output (a user ID is obtained outside from the copy ID according to needs).

The identification information is obtained as a tracing result, and the obtained identification information is output (a copy ID is acquired outside from the identification information according to needs, and a user ID is obtained from the copy ID).

Further, it is also possible to adopt a method of determining only one or a plurality of given sets of identification information as tracing targets instead of determining all sets of identification information which can be used or which are actually used as tracing targets. For example, when a specific colluder is known by any means, this method can be applied to specify remaining colluders.

Meanwhile, as described above, when a plurality of colluder groups matching with the same residue-pair representation exist by constraining a definite condition between the maximum colluder number c, the number M (=the number of component codes) of the integers and a range of the identification information to be used, at least one item of common identification information (identification information included commonly in all of a plurality of colluder groups) can be caused to exist. In this case, even if a plurality of colluder groups matching with the same residue-pair representation exist, the identification information of at least one colluder (for example, a user ID) can be obtained. One of such conditions will now be described hereinafter.

One of such conditions can be expressed as follows by using the maximum collusion number c, the number d of the component codes of the inner code (M in the above example) and a later-described identification information stipulation parameter k.

$$d > (c^2/2)(k-1)$$

The following shows that at least one item of common identification information necessarily exists even if a plurality of colluder groups matching with the same residue-pair representation exist when $d > (c^2/2)(k-1)$ is achieved.

In the reference described in connection with the prior art, the outer code is stochastically constituted in the assumption that the residue is regarded as an independent probability variable. This embodiment provides a method to combinatorially constitute the outer code without this assumption. There is provided a concept of the tracing enabling expression that the common collusion ID exists between them when a plurality of collusions which provide the same expression exist. A necessary condition which enables tracing of the residue-pair representation is obtained with respect to general $c \geq 2$. The property of the combinatorial outer code is formulated as a "tracing possibility expression".

It is assumed that U is a set of identification information (for example, user IDs) P is a given set and the following is given:

Map $\phi$: POW(U)→P

<Definition 1 (Traceable Representation)>

It is assumed that $CC \subset POW(U)$. When the following condition is satisfied, ($\phi$, P, CC) is determined as a traceable representation of U. Here, POW(U) is a power set of U.

$$\forall p \in P \left[ \bigcup_{\substack{C \in CC, \\ \phi(C)=p}} C \neq \{\} \Rightarrow \bigcap_{\substack{C \in CC, \\ \phi(C)=p}} C \neq \{\} \right] \quad (1)$$

<Definition 2 (Common Inverse)>

In the traceable representation of U ($\phi$, P, CC), the common inverse of $p \in P$ is defined as follows.

$$T(p) = \bigcap_{\substack{C \in CC, \\ \phi(C)=p}} C \quad (2)$$

It is to be noted that C corresponds to a given colluder group, p corresponds to a residue-pair representation, and a common inverse T(p) corresponds to "identification information (common identification information) which exists commonly in all of a plurality of colluder groups when a plurality of the colluder groups C suitable for the same residue-pair representation p exist".

<Theorem 1>

The traceable representation ($\phi$, P, CC) of U satisfying the following condition can be utilized as an outer code (identification information) of a c-secure code.

$$c = \min_{C \in \overline{CC}} \{|C|\} - 1 \quad (3)$$

where, $\overline{CC} = POW(U) - CC$ is determined.

It is to be noted that c is a maximum collusion number.

<Verification of Theorem 1>

It is assumed that an inner code (component code) outputs $p \in P$ where $p = \phi(C)$ by decoding a provided code word u. As to decoding in the outer code, it is determined that p is input and T(p) is output.

Based on the expression (3), if $|C| \leq c$, $C \in CC$ is achieved. At this moment, $T(p) \subset C$ is assured, and the c-secure code can be constituted.

Since the traceable representation has the combinatorial structure, an error in the outer code is not generated.

As a concrete structure of the traceable representation, application to the c-secure CRT code is assumed, and a structure based on a residue-pair representation which is a set of residue pairs is given. There is provided a sufficient condition for realizing the residue-pair representation to be the traceable representation.

<Condition 1>

It is assumed that u=Z/nZ, d relatively prime integers $p_0, \ldots p_{d-1}$, and an integer k(<d) satisfy $p_0 < \ldots < P_{d-1}$ and $|U| \leq p_0 p_1 \ldots p_{k-1}$.

<Definition 3 (Residue-Pair Representation)>

The condition 1 is assumed. A set P is defined as follow.

$$P = \{((r_0^{(-)}, r_0^{(+)}), \cdots, (r_{d-1}^{(-)}, r_{d-1}^{(+)})) \mid r_i^{(-)}, r_i^{(+)} \in Z/p_i Z \wedge r_i^{(-)} \leq r_i^{(+)}\}$$

The map $\phi: POW(U) \to P$ is defined as follows.

$$\phi(C) = ((r_0^{(-)}, r_0^{(+)}), \ldots, (r_{d-1}^{(-)}, r_{d-1}^{(+)}))$$
$$r_i^{(-)}(C) = \min_{u \in C}\{u \bmod p_i\}$$
$$r_i^{(+)}(C) = \max_{u \in C}\{u \bmod p_i\}$$

It is to be noted that Z indicates a set of the entire integers. Further, nZ indicates a result of multiplying an absolute value of each element in the set of the entire integers by n. Therefore, $U=Z/nZ=\{0, 1, 2, 3, \ldots n-1\}$ can be obtained.

($\phi$, P) is referred to as a residue-pair representation of U, and $p_0, \ldots, p_{d-1}$ are referred to as its modulo and expressed as $(p_0, \ldots p_{k-1}; p_k, \ldots p_{d-1})$.

It is to be noted that $p_0, \ldots p_{d-1}$ correspond to N(1), ... N(M) in the above example (d corresponds to M). Furthermore, $\phi(C)$ corresponds to $r^{(-)}_1, r^{(-)}_2, \ldots r^{(-)}_M, r^{(+)}_1, r^{(+)}_2, \ldots r^{(+)}_M$ in the above example. Moreover, k constrains a range of the identification information to be used to 0 to $p_0 \times p_1 \times \ldots \times p_{k-1} - 1$ (0 to $N(1) \times N(2) \times \ldots \times N(k) - 1$ in the above example) from the integers in the range of 0 to $p_0 \times p_1 \times \ldots \times p_{d-1} - 1$ (0 to $N(1) \times N(2) \times \ldots \times N(M) - 1$ in the above example). It is to be noted that k is referred to as an identification information number stipulation parameter.

In case of c=2 and general $k \geq 2$:

<Theorem 2>

Condition 1 is assumed.

The residue-pair representation ($\phi$, P) of U gives the traceable representation ($\phi$, P, CC) if the following is achieved.

$$CC = |\{C \in POW(U) | |C| \leq 2\},$$
$$d \geq 2k - 1$$

<Lemma 1>

In the residue-pair representation of U, it is assumed that $C \in POW(U)$ and the following expression are achieved.

$$\phi(C) = ((r_0^{(-)}, r_0^{(+)}), \ldots, (r_{d-1}^{(-)}, r_{d-1}^{(+)}))$$

Then, the following expression can be obtained.

$$\forall i \in Z/dZ \exists u \in C[u \equiv r_i^{(-)} \bmod p_i]$$
$$\forall i \in Z/dZ \exists u \in C[u \equiv r_i^{(+)} \bmod p_i]$$

<Verification of Lemma 1>

With respect to each residue, it is self-apparent that at least one original C which generates each residue exists.

<Notation 1>

A distance between u and $u' \in U$ is expressed as follows.

$$\delta(u, u') \equiv |\{i \in Z/dZ | u \equiv u' \bmod p_i\}|$$

<Lemma 2>

Condition 1 is assumed. With respect to u, $u' \in C$, the following can be achieved.

$$u = u' \Leftrightarrow \delta(u, u') = 0$$
$$u \neq u' \Leftrightarrow \delta(u, u') \geq d - k - 1$$

<Verification of Lemma 2>

As to u and u', u=u' is achieved based on Chinese remainder theorem when k residues match between u and u'. At this moment, any other residues all match between them.

<Verification of Theorem 2>

It is assumed that the original C of $POW(U)=\{u_1, u_2\}$, $C'=\{u_1', u_2'\}$ satisfies the following.

$$\phi(C) = \phi(c') \quad (4)$$
$$C \cap C' = \{\ \} \quad (5)$$

Figure 27:
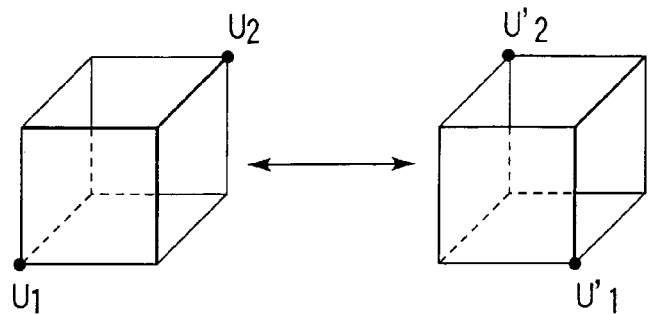
FIG. 27 is a view illustrating exchange of residues.

It is to be noted that { } indicates an empty set. It is determined that $d' \equiv \delta(u_1, u_2) = \delta(u_1', u_2') \leq d$. The expression (4) corresponds to some (determined as m) modulo between $u_1$ and $u_2$, and means that $u_1'$ and $u_2'$ can be obtained by exchanging residues having different values (see FIG. 27). When trying to counterchange $u_1$ and $u_1'$ and counterchange $u_2$ and $u_2'$ by this exchange, the following can be achieved.

$$\delta(u_1, u_1') = \delta(u_2, u_2') = m$$
$$\delta(u_1, u_2') = \delta(u_1', u_2) = d' - m$$

Based on the expression (5), $u_1' \neq u_1$, $u_1' \neq u_2$ can be obtained. The lemma 2 is applied to this, and the following is the sufficient condition that the expressions (4) and (5) can be achieved.

$$d - k + 1 \leq m \leq d' - d + k - 1$$

As a result, when $d \leq 2k - 1$, the expressions (4) and (5) cannot be achieved, and the following expression can be obtained.

$$\phi(C) = \phi(C') \Rightarrow C \cap C' \neq \{\ \}$$

In addition, if one common original exits between C and C', the remaining originals match with each other based on the lemma 1, and C=C' can be achieved. Therefore, the expression (1) is satisfied, and ($\phi$, P, CC) is the traceable representation of U.

The c-secure CRT code having the above traceable representation as an outer code is still c=2, but it can be regarded as a code obtained by generalizing the 2-secure code in "J. Yoshida, K. Iwamura and H. Imai, "A coding method for collusion-secure watermark and less decline", SCIS '98-10.2A, 1998." from k=2 to $k \geq 2$.

In case of general $c \geq 2$ and general $k \geq 2$:

With respect to general $c \geq 2$ and $k \geq 2$, the sufficient condition which enables the residue-pair representation to be the traceable representation is provided.

<Theorem 3>

Condition 1 is assumed.

The residue-pair representation of U ($\phi$, P) gives the traceable representation of U ($\phi$, P, CC) if the following is achieved.

$$CC = \{C \in POW(U) | \ |C| \leq c\} \quad (6)$$
$$d > c^2(k-1)/2 \quad (7)$$

<Verification of Theorem 3>

A proposition PP(r) is defined as follows.

$$\forall C_1, \ldots C_r \in CC[\phi(C_1) = \ldots = \phi(C_r) \Rightarrow C_1 \cap \ldots \cap C_r \neq \{\}]$$

A basal proposition is determined as PP(2), and verification is carried out based on the mathematical induction which determines the step of the induction as follows.

$$\forall r \geq 2[PP(r) \Rightarrow PP(r+1)]$$

Verification of the proposition PP(2):

It is assumed that the two collusions $C_1 = \{u_1, \ldots u_c\}$ and $C2 = \{u_1', \ldots u_c'\}$ satisfy the following.

$$\phi(C_1) = \phi(C_2) \qquad (8)$$

$$C_1 \cap C_2 = \{\} \qquad (9)$$

With respect to the set of the residue pairs $\phi(C_1)$ relative to $C_1$, the following is defined.

$$\Omega \equiv (i \in Z/dZ \mid r_i^{(-)} \neq r_i^{(+)}\}$$

$$g \equiv d - |\Omega|$$

With respect to $u \in U$, the following is defined.

$$V^{(-)}(u) \equiv \{(i, -) \mid i \in \Omega, u \equiv r_i^{(-)} \equiv r^{(+)} \mod p_i\}$$

$$V^{(+)}(u) \equiv \{(i, +) \mid i \in \Omega, u \equiv r_i^{(+)} \equiv r^{(-)} \mod p_i\}$$

$$V(u) \equiv V^{(-)}(u) \cup V^{(+)}(u),$$

Based on the expression (8), the following expression can be obtained.

$$\bigcup_{i=1}^{C} V(u_i) = \bigcup_{i=1}^{C} V(u_i')$$

$$= \{\bigcup_{i=1}^{C} V(u_i)\} \cap \{\bigcup_{j=1}^{C} V(u_j')\}$$

In the above expression, the order on the both sides is taken.

$$2(d-g) = |\{\bigcup_{i=1}^{C} V(u_i)\} \cap \{\bigcup_{j=1}^{C} V(u_j')\}| \qquad (10)$$

$$= |\bigcup_{i=1}^{C} \bigcup_{j=1}^{C} \{V(u_i) \cap V(u_j')\}|$$

$$\leq \sum_{i=1}^{C} \sum_{j=1}^{C} |V(u_i) \cap V(u_j')|$$

Based on the expression (9), since $\forall i, j[u_i \neq u_j']$, the following expression can be obtained based on the lemma 2.

$$|V(u_i) \cap V(u_j')| \leq k - g - 1 \qquad (11)$$

Therefore, the following expression is obtained by substituting the expression (11) for the expression (10).

$$d \leq c^2(k-1)/2 - (c^2/2 - 1)g$$

Therefore, when the condition $d > c^2(k-1)/2$ assumed by the theorem is satisfied, the preposition PP(2) is achieved.

Verification of Preposition PP(r)=>Preposition PP(r+1):

It is assumed that (r+1) collusions $C_i$ (i=1, ... r+1) satisfies the following condition.

$$\forall i \in \{1, \cdots r+1\}[|C_i| \leq c]$$

$$\phi(C_1) = \cdots = \phi(C_{r+1})$$

Assume that P(r) holds but P(r+1) does not hold. Then, we can derive a contradiction as follows. Assume the following expression.

$$c^\cap \equiv \bigcap_{i=1}^{r+1} C_i = \{\} \qquad (12)$$

The following expression is achieved based on the basal preposition P(r).

$$\forall i \in \{1, \cdots, r+1\}\left[\overline{C}_i^\cap \equiv \bigcap_{\substack{j=1, \\ j \neq i}}^{r+1} C_j \neq \{\}\right]$$

Based on the expression (12), the following expression can be achieved.

$$\forall i \forall j \neq i [\overline{C}_i^\cap \cap \overline{C}_j^\cap = C^\cap = \{\}]$$

Figure 28:
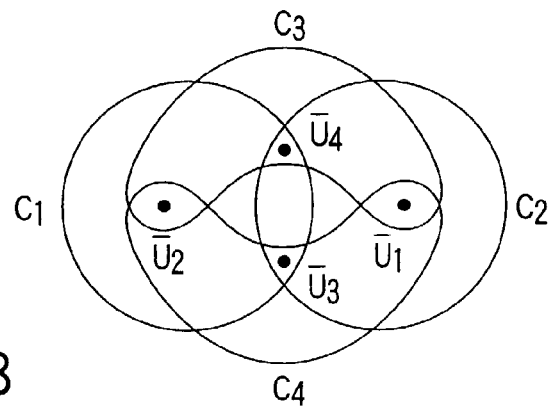
FIG. 28 is a view illustrating a case of r=c=3.

Based on the above expression, the following expression can be achieved (see FIG. 28).

$$\forall i \in \{1, \cdots, r+1\} \exists \bar{u}_i \in \overline{C}_i^\cap [i \neq j \Rightarrow \bar{u}_i \neq \bar{u}_j]$$

Since $\forall i \neq i[\overline{u}_j \in C_i]$, the following expression can be achieved.

$$C_i = \supset \{\overline{u}_j \mid j = 1, \cdots, i-1, i+1, \cdots, r+1\}$$

Therefore, $r \leq C_i \leq c$ can be obtained.

In case of $r > c$, the expression (12) is apparently the contradiction.

In case of $r = c$, the following expression can be achieved with respect to each i.

$$C_i = \{\overline{u}_j \mid j = 1, \cdots, i-1, i+1, \cdots, c+1\}$$

The following expression can be achieved with respect to each $j(\neq i)$.

$$|V(\overline{u}_j)| = \left| V(\overline{u}_j) \cap \bigcup_{u \in C_i} V(u) \right| \leq c(k-g-1) \quad (13)$$

Therefore, the following expression can be achieved.

$$2(d-g) = \left| \bigcup_{\substack{j=1, \\ j \neq 1}}^{c+1} \left\{ V(\overline{u}_j) \cap \bigcup_{u \in C_i} V(u) \right\} \right| \leq c^2(k-g-1)$$

Based on this, the following expression can be achieved.

$$|V(\overline{u}_j 1 \cdots jw)| = \left| V(\overline{u}_j 1 \cdots jw) \cap \bigcup_{u \in C_{ji}} V(u) \right| \leq c(k-g-1)$$

Therefore, when the condition $d > c^2(k-1)/2$ assumed by the theorem is satisfied, the expression (12) is the contradiction.

In case of $r < c$, as a point different from the discussion when $r = c$, as an original of $C_i$, there are the possibility that there is the original which does not correspond to $\overline{u}_j(j \neq i)$ defined above and doesn't belong to any $\overline{C}^\cap_i$ (exception 1) and the possibility that two or more originals of a given $\overline{C}^\cap_i$ exist (exception 2).

The original $\overline{u}_j \ldots jw$ in the exception 1 does not belong to $w(2 \leq w \leq r)$ collusions $C_{j1}, \ldots C_{jw}(j_i \in \{1, \ldots r+1\})$ collusions but belongs to the remaining $(r-w+1)$ collusions. In this case, like the expression (13), an appropriate $C_{ji}$ is selected, and the following expression can be obtained.

$$|V(\overline{u}_{j1 \ldots jw})| = \left| V(\overline{u}_{j1 \ldots jw}) \cap \bigcup_{u \in C_{ji}} V(u) \right| \leq c(k-g-1)$$

Two or more originals in the exception 2 respectively satisfy the expression (13). Therefore, even if the exception 1 or the exception 2 exists, the same discussion as that in case of $r = c$ can be developed. When the condition $d > c^2(k-1)/2$ assumed by the theorem is satisfied, the expression (12) is the contradiction. Based on this, the preposition $PP(r) \Rightarrow$ the preposition $PP(r+1)$ is verified.

As described above, it is proved that at least one set of common identification information necessarily exists when $d > (c^2/2)(k-1)$ is achieved even if a plurality of colluder groups matching with the same residue-pair representation exist.

It is to be noted that the system can be formed by using a condition obtained by modifying the condition $d > (c^2/2)(k-1)$. Since the above condition is not the necessary sufficient condition, it is possible to adopt a structure that the identification information of at least one colluder (user ID) can be necessarily obtained by using a value smaller than d or a value larger than k which satisfies the above condition even if a plurality of colluder groups matching with the same residue-pair representation exist (for instance, the example shown in FIG. 16 is obtained by modifying the above condition). Further, even if there occur some cases which cannot specify the identification information of colluders (user IDs) at all since a plurality of colluder groups matching with the same residue-pair representation exist and there is no user ID which exists commonly in all of a plurality of the colluder groups, the system can be constituted with a shorter code by using the value obtained by modifying the above condition as long as such cases can be allowed.

Description will now be given as to a case where the present invention can be applied to a c-secure CRT code on a Dedekind ring.

In the present embodiment, the c-secure CRT code is obtained by applying the mathematical theorem called the Chinese remainder theorem and the identification information is represented in the form of integers by using integer modulo $p_0, p_1, \ldots p_{d-1}$, but achievement of the Chinese remainder theorem is not restricted to a ring formed by integers. In the ring called the Dedekind ring, it is well known that the Chinese remainder theorem is achieved. Therefore, the present invention can be likewise applied to the c-secure CRT code constituted on the Dedekind ring. As the Dedekind ring other than a ring formed by integers, a polynomial ring over an infinite field is known. A structure of the c-secure CRT code on such a polynomial ring over the infinite field is described in detail in a reference "M. Kim, J. Shikata, H. Murakami, and H. Imai, "Constructing c-secure codes using polynomials over finite fields", SITA2001, W-B-1-3, 2001."

Giving explanation in comparison with the ring formed by integers, the modulo $p_0, p_1 \ldots p_{d-1}$ are a set of relatively prime integers in case of the ring formed by integers, but they are the following set of an irreducible polynomial having no common factor in case of the polynomial ring.

$$p_0(x), p_1(x), \ldots p_{d-1}(x)$$

In place of the condition $p_0 < p_1 < \ldots < p_{d-1}$, the following condition is used.

$$\deg(0) \leq \deg(1) \leq \ldots \deg(d-1)$$

Here, deg(i) is determined as an order of the polynomial $p_i(x)$. Here, it is assumed that a coefficient of the polynomial is defined over an infinite field F(q). In place of the condition $|U| \leq p_0 \times p_1 \times \ldots \times p_{k-1}$, the following condition is used.

$$|U| \leq q^{\deg(0)} \times q^{\deg(1)} \times \ldots \times q^{\deg(k-1)}$$

U in this expression is determined as a set of monic polynomials of the $(\deg(0) + \deg(1) + \ldots + \deg(k-1))$ or lower order.

When the magnitude relationship between the two polynomials is defined and the residue is determined as a residue in the meaning of polynomials (for example, when all the possible residues are associated with positive integers starting from 0 in accordance with each polynomial $p_i(x)$ which can be a modulo and the positive integers are processed as the reference residue in the modulo mentioned above), the c-secure CRT code is constituted over the polynomial ring in completely the same way as the ring of the integers described above, thereby configuring the combinatorial outer code.

A hardware structure and a software structure of this embodiment will now be described hereinafter.

The electronic watermark analysis apparatus according to this embodiment can be realized as hardware as well as software (program (for causing a computer to execute predetermined means, or causing a computer to function as predetermined means, or causing a computer to realize a predetermined function)). Further, in case of realizing the electronic watermark analysis apparatus in the form of software, a program can be transferred by using a recording medium, or a program can be distributed by using a communication medium. Of course, these can be also applied to the electronic watermark embedding apparatus.

Furthermore, in case of forming the electronic watermark embedding apparatus or the electronic watermark analysis apparatus as hardware, it can be formed as a semiconductor apparatus.

Moreover, in case of forming the electronic watermark analysis apparatus to which the present invention is applied, or in case of creating an electronic watermark analysis program, even if there are block or modules having the same structure (or a structure which can be shared or used repeatedly), they all can be individually created. However, only one or an appropriate number of blocks or modules having the same structure (or a structure which can be shared or used repeatedly) may be prepared, and they may be shared (used repeatedly) in each part in the algorithm. In case of forming the electronic watermark embedding apparatus or creating an electronic watermark embedding program, this can be also applied. In addition, when forming a system including the electronic watermark embedding apparatus and the electronic watermark analysis apparatus, or when creating a system including the electronic watermark embedding program and an electronic watermark detection program, only one or an appropriate number of blocks or modules having the same structure (or a structure which can be shared or used repeatedly) may be prepared over the electronic watermark embedding apparatus (or program) and the electronic watermark analysis apparatus (or program), and they may be shared (used repeatedly) in each part in the algorithm.

Further, in case of forming the electronic watermark embedding apparatus or the electronic watermark analysis apparatus in the form of software, a multiprocessor may be utilized, parallel processing may be carried out, and a speed of processing may be increased.

The structure described above can be achieved as not only a part of the apparatus but also one apparatus. For example, the decoding device 22 of the electronic watermark analysis apparatus 2 can be achieved as an integral and inseparable constituent part configuring the electronic watermark analysis apparatus 2, or a part, a module and the like forming the electronic watermark analysis apparatus, or an independent decoding device.

Meanwhile, a watermark technique with respect to a digital watermark can be applied to digital data as well as a matter having given information or a material whose identity, homogeneity, economic merit or the like cannot be changed even if contents of a part of the information or the material are varied, and the present invention can be applied to such information or a material as well as digital data.

For example, in the present invention, generating means and detecting means for a code to be embedded which are used in the electronic watermark embedding apparatus/ electronic watermark analysis apparatus having the resistance to collusion attacks can be applied to tracing of a source of a chemical compound or a chemical material which is chemically synthesized or biologically generated in an environment industrially managed. As a chemical compound, DNA, RNA, protein and any other polymeric compounds have many redundancies enabling embedding of a code.

Description will now be given as to a case where the present invention is applied as a watermark technique which provides means for embedding individual information (a user ID, a manufacturer ID, a seller ID, a transaction ID, information of combining these IDs and others) to a copy of a compound and specifying a source thereof.

A compound includes materials such as a plurality of atoms, molecules and groups. For example, DNA or RNA has a predetermined array structure of an amino acid, and information can be represented by whether this structure is substituted by that of another amino acid. In one of structures of the compound, there is a case where the identify or economic merit of a work is not changed even if data is varied in the event of digital contents. Likewise, even if a composition is changed, there is a case that its property/ function and others such as an effect/side effect/utility (in another point of view, an economic merit) are not changed in the purpose. Information which individually identifies the copy can be embedded by a change within such an allowable range.

In case of applying the electronic watermark according to the present invention to a compound, the watermark embedding apparatus relative to the compound has a structure which changes bits in a predetermined part of digital contents in the watermark embedding apparatus with respect to digital contents being substituted by an apparatus which changes a composition of a predetermined part of the compound. The code generator may have the similar structure. Furthermore, the watermark analysis apparatus relative to a compound has a structure which detects information used to read values of bits in a predetermined part in digital contents in order to detect watermark information in the watermark analysis apparatus with respect to the digital contents being substituted by an apparatus which analyzes a composition of a predetermined part of the compound in order to detect the watermark information. The decoding device may have the similar structure. That is, only a device which can be an interface with a compound is different, and other parts are the same as those of the watermark technique relative to digital contents in theory.

Figure 29:
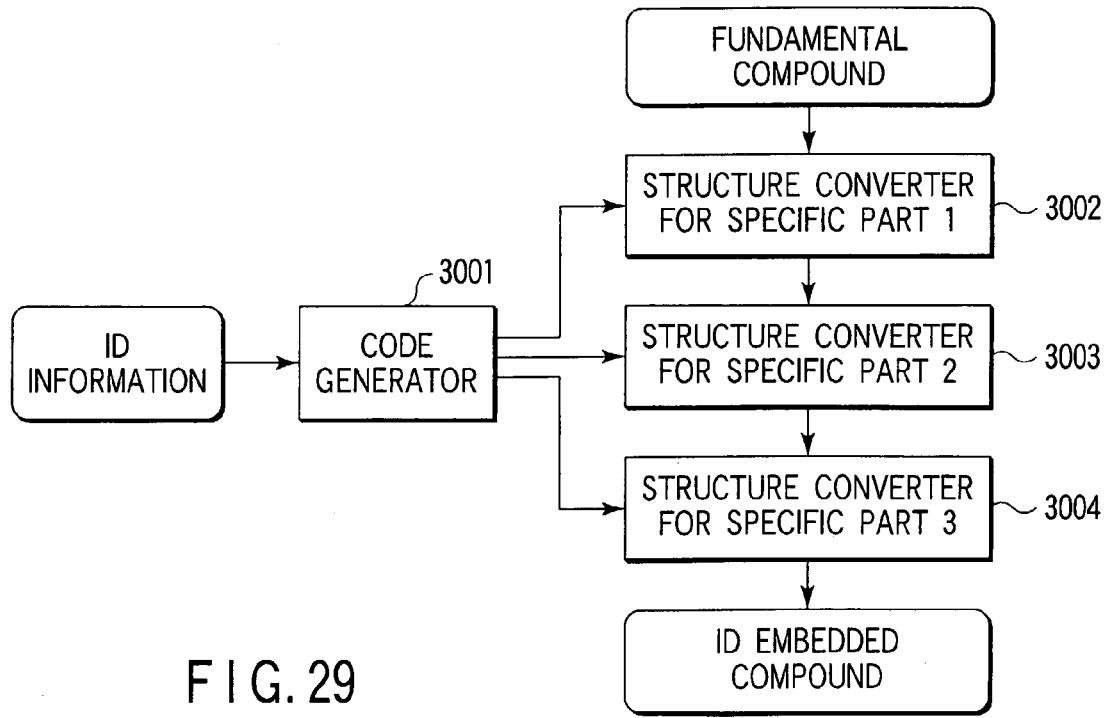
FIG. 29 is a view showing a structural example of an electronic watermark embedding apparatus relative to a chemical compound according to a second embodiment.

FIG. 29 shows a structural example of a watermark embedding apparatus relative to a compound.

A code generator 3001 receives identification information to be embedded in the compound and outputs a collusion-secure code. It may have the same structure as the code generating device 11 illustrated in FIG. 2.

Structure converters 3002 to 3004 for a specific part respectively convert a structure of the compound with respect to each bit of a collusion-secure code or a each set of bits in accordance with a value thereof. The structure converter 3002 for a specific part processes a specific part 1 of a fundamental compound, the structure converter 3003 for a specific part processes a specific part 2 of the compound obtained by processing the specific part 1, and the structure converter 3004 for a specific part processes a specific part 3 of the compound obtained by processing the specific parts 1 and 2 and generates a desired compound having information embedded therein. Of course, the three structure converters are illustrated in FIG. 29 but the number of these portions is not restricted to three.

Here, conversion of the structure of the compound represents means for converting into a compound having a different structure without deteriorating a property, function or the like suitable for a purpose of utilization of the compound and without causing a new adverse effect, side effect and others. Alternatively, when the compound is not a pure compound but a mixture, it may be means for changing its composition.

FIG. 30 shows another structural example of the watermark embedding apparatus relative to the compound.

Although the structural example of FIG. 29 converts the structure of the already synthesized compound later, the structural example of FIG. 30 embeds a code when synthesizing the compound.

The code generator 3011 inputs identification information to be embedded in the compound and generates a collusion-secure code. It may have the same structure as that of the code generating device 11 of FIG. 2.

In this example, a synthetic material according to a value of each bit of a collusion-secure code or a each set of bits is prepared with respect to such each bit or set in accordance with each synthetic material. Synthetic material selectors 3012 to 3014 respectively select a synthetic material of the compound according to a value of each bit of a collusion-secure code or each set of bits with respect to such each bit or set. Although the three synthetic material selection portions are shown in FIG. 30, the number of the portions is not restricted to three.

The synthesis portion 3015 combines synthetic materials selected by the respective synthetic material selectors 3012 to 3014 and generates a desired embedded compound.

Meanwhile, in a collusion attack to the compound, basically like the collusion attack to digital contents, for example, the collusion attack is generated by changing a structure in a part where there is a difference by comparing structures of the compounds having a plurality of sets of different identification information (for example, user IDs, manufacturer IDs, user IDs and manufacturer IDs, and others).

FIG. 31 shows a structural example of the watermark analysis apparatus relative to a compound.

Structure reading circuits 3201 to 3201 for a specific part correspond to the structure converters 3002 to 3004 for a specific part shown in FIG. 29 or the synthetic material selectors 3012 to 3014 illustrated in FIG. 30, read a structure of a specific part in the compound, and output it as information of a bit or a set of bits.

The decoder 3204 executes the tracing algorithm based on these bits and specifies that there has been no collusion attack or specifies a user ID corresponding to a collusion-secure code embedded in a copy which might have been used in the collusion attack. It may have the same structure as that of the decoding device 22 shown in FIG. 3.

Here, in regard to conversion means for a structure of a compound or a reading means for a structure used in the present invention, a usable technique will be described. Description will be given as to an example of DNA.

In DNA, obtaining its base sequence is referred to as sequencing. As a method of sequencing, there are known a shotgun method, a primer walk method, a nested deletion method and others. They are all methods based on cloning of a gene. As to examples of a reagent/device/apparatus used in sequencing, various kinds of methods have been proposed. For example, such a method is disclosed in "Cloning and Science" supervised by Kaku Watanabe, edited by Masahiro Sugiura, Nouson Bunka Sha (1989) or "Genome Science" edited by Katsuyuki Sakaki and others, Kyoritsu Shuppann (1999).

Likewise, in the example of DNA, structure conversion is enabled by a gene introduction method used when introducing a new gene. As a gene introducing method, there are known a chemical method such as a calcium phosphate sedimentation, a dextran method or a ribofection method, an electroporation, and a microinjection method. For example, such a method is disclosed in "Molecular Cell Technology" by Nobuyuki Haga, Colona Sha (2000).

Meanwhile, as an applicable example other than tracing of digital contents to a copy, there has been described an example of tracing relative to a compound or a chemical material.

Assuming that such a tracing target is referred to as an "object", the present invention can be applied to tracing of an object other than digital contents, a compound or a chemical material. In this embodiment, as an example of electronic data that an object does not have a physical entity (or electronic data transferred with a physical entity being used as a medium), the digital contents have been explained. In this embodiment, as a technique of embedding a collusion-secure code corresponding to the identification information to the digital contents, the electronic watermark technique is used, but the present invention can be applied to any other cases where other techniques are used. Furthermore, in this embodiment, as an example that the object is a material, DNA, RNA or protein which includes gene information has been described. In this embodiment, as a technique of writing a collusion-secure code corresponding to the identification information to DNA, RNA, protein and the like, description has been given as to the example of carrying out such a technique by recombination of DNA or substitution of an amino acid array of protein. However, as described above, only the technique which is an interface with the object is different, the identification information or the collusion-secure code can be processed in the electronic information processing system, and this processing is the same in any objects in theory. Therefore, the above-described structure can be provided by only selecting the technique of embedding the collusion-secure code corresponding to the identification information to the object in accordance with the object.

According to the embodiments of the present invention, the identification information of the object used in the collusion attack to the object having the identification information based on the collusion-secure code embedded therein can be assuredly traced by using a shorter code length.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the present invention can be practiced as a computer readable recording medium in which a program for allowing the computer to function as predetermined means, allowing the computer to realize a predetermined function, or allowing the computer to conduct predetermined means.

The present invention can be also applied when using the "information which represents the identification information" having a structure different from that of the above-described collusion-secure code. In this case, for example, when obtaining the corresponding identification information based on the information which represents the identification information extracted from the object, the information which represents the identification information extracted from a target object is input, and a collusion group (for example, a colluder group that can generate the input information which represents the identification information by a collusion attack or that has a high probability of generation of this information) having a fixed relationship with the input information which represents the identification information is obtained from collusion groups formed of arbitrary combinations of the identification information whose collusion number is not more than a predetermined maximum collusion number. Also, when a plurality of collusion groups are obtained, the identification information which exists commonly in a plurality of these colluder groups.

Incidentally, the structure described in the embodiment according to the present invention is an example, and any other structures are not excluded. Different structures can be carried out, which can be obtained by substituting a part of the illustrated structure by another structure, omitting a part of the illustrated structure, adding another function or element to the illustrated structure or combining these structures. It is possible to adopt another structure logically equivalent to the exemplified structure, another structure including a part logically equivalent to the exemplified structure, another structure logically equivalent to a primary part of the exemplified structure. Furthermore, it is possible to employ another structure which can attain the similar or same purpose as that of the exemplified structure, another structure which demonstrates the same or similar advantage as that of the exemplified structure, and others.

Moreover, many variations of various constituent parts exemplified in the embodiment according to the present invention can be appropriately combined and carried out.

The present invention is not restricted to the foregoing embodiment and can be modified in many ways within a technical range thereof.

What is claimed is:

1. An apparatus which analyzes items of identification information of an object based on a code extracted from the object, the apparatus comprising:
    a detector which is configured to detect a first boundary position information representing a boundary position on a high-order bit side and second boundary position information representing a boundary position on a low-order bit side in a changed part relative to a pattern of a bit string of each of a plurality of components forming the code extracted from the object;
    a colluder group extraction unit which is configured to extract, from colluder groups formed of combinations of a predetermined number of items of the identification information, a colluder group or colluder groups matching with a set of the first and second boundary position information detected by the detector; and
    a colluder extraction unit which is configured to extract items of the identification information included in a single colluder group if the colluder group extraction unit extracts the single colluder group, and if the colluder group extraction unit extracts colluder groups, the colluder extraction unit is configured to extract items of the identification information included in all of the extracted colluder groups,
    wherein the colluder group extraction unit is configured to extract a colluder group or colluder groups matching with a set of the first and second boundary position information detected by the detector based on predetermined information indicative of a relationship between a set of the first and second boundary position information and one or a plurality of colluder groups matching with the set of the first and second boundary position information.

2. The apparatus according to claim 1, wherein, the colluder extraction unit which, when there is no item of the identification information included in all of the extracted colluder groups, outputs information indicative of no item of the identification information.

3. The apparatus according to claim 1, wherein the colluder extraction unit comprises at least one of:
    a first unit which is configured to detect all of the items of the identification information forming the colluder group matching with the set of the first and second boundary position information detected by the detector based on predetermined information indicative of a relationship between the set of the first and second boundary position information and all of the items of the identification information forming the colluder group matching with the set of the first and second boundary position information;
    a second unit which is configured to detect items of the identification information included in all of the extracted colluder groups matching with the set of the first and second boundary position information detected by the detector based on predetermined information indicative of a relationship between the set of the first and second boundary position information and items of the identification information included in all of the extracted colluder groups matching with the set of the first and second boundary position information; and
    a third unit which is configured to detect that there is no colluder group matching with the set of the first and second boundary position information detected by the detector, based on predetermined information indicative of a relationship between the set of the first and second boundary position information and information indicating that there is no colluder group matching with the set of the first and second boundary position information.

4. The apparatus according to claim 1, wherein the colluder extraction unit is configured to detect a colluder group or colluder groups matching with the set of the first and second boundary position information detected by the detector based on the set of the first and second boundary position information detected by the detector and a set of third boundary position information representing a boundary position where a pattern of a bit string in each of a plurality of components forming a collusion-secure code corresponding to the identification information varies.

5. The apparatus according to claim 1, wherein the colluder extraction unit comprises:
    a first unit which is configured to detect a colluder group matching with the set of the first and second boundary position information detected by the detector;
    a second unit which is configured to detect colluder groups including identification information included in the colluder group detected by the first unit and extracts colluder groups matching with the set of the first and second boundary position information detected by the detector among the colluder groups including the identification information; and a third unit which is configured to detect identification information common to the colluder groups extracted by the second unit and outputs the obtained identification information as information indicative of a colluder attacker relative to the object.

6. The apparatus according to claim 1, wherein the colluder extraction unit comprises:

a first unit which is configured to detect a colluder group matching with the set of the first and second boundary position information detected by the detector;

a second unit which is configured to determine whether there is a colluder group which does not include item of the identification information contained in the colluder group detected by the first unit and which matches with the set of the first and second boundary position information detected by the detector; and a third unit which is configured to output the specific identification information as information indicative of a collusion attacker relative to the object when the second unit determines that there is no colluder group.

7. An apparatus which analyzes items of identification information of an object based on a code extracted from the object, the apparatus comprising:

a detector which is configured to detect a first boundary position information representing a boundary position on a high-order bit side and second boundary position information representing a boundary position on a low-order bit side in a changed part relative to a pattern of a bit string of each of a plurality of components forming the code extracted from the object;

a colluder group extraction unit which is configured to extract, from colluder groups formed of combinations of a predetermined number of items of the identification information, a colluder group or colluder groups matching with a set of the first and second boundary position information detected by the detector; and a colluder extraction unit which is configured to extract items of the identification information included in a single colluder group if the colluder group extraction unit extracts the single colluder group, and if the colluder group extraction unit extracts colluder groups, the colluder extraction unit is configured to extract items of the identification information included in all of the extracted colluder groups, wherein the colluder extraction unit comprises at least one of:

a first unit which is configured to detect all of the items of the identification information forming the colluder group matching with the set of the first and second boundary position information detected by the detector based on predetermined information indicative of a relationship between the set of the first and second boundary position information and all of the items of the identification information forming the colluder group matching with the set of the first and second boundary position information;

a second unit which is configured to detect items of the identification information included in all of the extracted colluder groups matching with the set of the first and second boundary position information detected by the detector based on predetermined information indicative of a relationship between the set of the first and second boundary position information and items of the identification information included in all of the extracted colluder groups matching with the set of the first and second boundary position information; and a third unit which is configured to detect that there is no colluder group matching with the set of the first and second boundary position information detected by the detector, based on predetermined information indicative of a relationship between the set of the first and second boundary position information and information indicating that there is no colluder group matching with the set of the first and second boundary position information.

8. The apparatus according to claim 7, wherein, the colluder extraction unit which, when there is no item of the identification information included in all of the extracted colluder groups, outputs information indicative of no item of the identification information.

9. The apparatus according to claim 7, wherein the colluder extraction unit is configured to detect a colluder group or colluder groups matching with the set of the first and second boundary position information detected by the detector based on the set of the first and second boundary position information detected by the detector and a set of third boundary position information representing a boundary position where a pattern of a bit string in each of a plurality of components forming a collusion-secure code corresponding to the identification information varies.

10. The apparatus according to claim 7, wherein the colluder extraction unit comprises:

a first unit which is configured to detect a colluder group matching with the set of the first and second boundary position information detected by the detector;

a second unit which is configured to detect colluder groups including identification information included in the colluder group detected by the first unit and extracts colluder groups matching with the set of the first and second boundary position information detected by the detector among the colluder groups including the identification information; and a third unit which is configured to detect identification information common to the colluder groups extracted by the second unit and outputs the obtained identification information as information indicative of a colluder attacker relative to the object.

11. The apparatus according to claim 7, wherein the colluder extraction unit comprises:

a first unit which is configured to detect a colluder group matching with the set of the first and second boundary position information detected by the detector;

a second unit which is configured to determine whether there is a colluder group which does not include item of the identification information contained in the colluder group detected by the first unit and which matches with the set of the first and second boundary position information detected by the detector; and a third unit which is configured to output the specific identification information as information indicative of a collusion attacker relative to the object when the second unit determines that there is no colluder group.

12. An apparatus which analyzes items of identification information of an object based on a code extracted from the object, the apparatus comprising:

a detector which is configured to detect a first boundary position information representing a boundary position on a high-order bit side and second boundary position information representing a boundary position on a low-order bit side in a changed part relative to a pattern of a bit string of each of a plurality of components forming the code extracted from the object;

a colluder group extraction unit which is configured to extract, from colluder groups formed of combinations of a predetermined number of items of the identification information, a colluder group or colluder groups matching with a set of the first and second boundary position information detected by the detector; and a colluder extraction unit which is configured to extract items of the identification information included in a single colluder group if the colluder group extraction unit extracts the single colluder group, and if the colluder group extraction unit extracts colluder groups, the colluder extraction unit is configured to extract items of the identification information included in all of the extracted colluder groups, wherein the detector is configured to detect the first boundary position information based on a change in pattern of the bit string when seen from a high-order bit side of the components, and is configured to detect the second boundary position information based on a change in pattern of the bit string when seen from a low-order bit side of the components.

13. The apparatus according to claim 12, wherein, the colluder extraction unit which, when there is no item of the identification information included in all of the extracted colluder groups, outputs information indicative of no item of the identification information.

14. The apparatus according to claim 12, wherein the colluder group extraction unit is configured to extract a colluder group or colluder groups matching with a set of the first and second boundary position information detected by the detector based on predetermined information indicative of a relationship between a set of the first and second boundary position information and one or a plurality of colluder groups matching with the set of the first and second boundary position information.

15. The apparatus according to claim 12, wherein the colluder extraction unit comprises at least one of:

a first unit which is configured to detect all of the items of the identification information forming the colluder group matching with the set of the first and second boundary position information detected by the detector based on predetermined information indicative of a relationship between the set of the first and second boundary position information and all of the items of the identification information forming the colluder group matching with the set of the first and second boundary position information;

a second unit which is configured to detect items of the identification information included in all of the extracted colluder groups matching with the set of the first and second boundary position information detected by the detector based on predetermined information indicative of a relationship between the set of the first and second boundary position information and items of the identification information included in all of the extracted colluder groups matching with the set of the first and second boundary position information; and a third unit which is configured to detect that there is no colluder group matching with the set of the first and second boundary position information detected by the detector, based on predetermined information indicative of a relationship between the set of the first and second boundary position information and information indicating that there is no colluder group matching with the set of the first and second boundary position information.

16. The apparatus according to claim 12, wherein the colluder extraction unit is configured to detect a colluder group or colluder groups matching with the set of the first and second boundary position information detected by the detector based on the set of the first and second boundary position information detected by the detector and a set of third boundary position information representing a boundary position where a pattern of a bit string in each of a plurality of components forming a collusion-secure code corresponding to the identification information varies.

17. The apparatus according to claim 12, wherein the colluder extraction unit comprises:

a first unit which is configured to detect a colluder group matching with the set of the first and second boundary position information detected by the detector;

a second unit which is configured to detect colluder groups including identification information included in the colluder group detected by the first unit and extracts colluder groups matching with the set of the first and second boundary position information detected by the detector among the colluder groups including the identification information; and a third unit which is configured to detect identification information common to the colluder groups extracted by the second unit and outputs the obtained identification information as information indicative of a colluder attacker relative to the object.

18. The apparatus according to claim 12, wherein the colluder extraction unit comprises:

a first unit which is configured to detect a colluder group matching with the set of the first and second boundary position information detected by the detector;

a second unit which is configured to determine whether there is a colluder group which does not include item of the identification information contained in the colluder group detected by the first unit and which matches with the set of the first and second boundary position information detected by the detector; and a third unit which is configured to output the specific identification information as information indicative of a collusion attacker relative to the object when the second unit determines that there is no colluder group.

19. The apparatus according to claim 12, wherein each of a plurality of the components is a bit string including only continuous 1 or 0 having a predetermined bit number, the code includes a string of unit bits, and further includes a code obtained by concatenating a string of unit bits including only 1 from a high-order bit side and subsequently concatenating a string of unit bits including only 0, a code obtained by concatenating a string of unit bits including only 0, and a code obtained by concatenating a string of unit bits including only 1, and the detector comprises:

a first unit which is configured to detect, when there is a first position at which the string of unit bits including only 0 and the string of unit bits including only 1 are adjacent to each other, as the first boundary position information is an integer value indicative of the first position;

a second unit which is configured to detect, when there is a second position at which the string of unit bits including only 1 and the string of unit bits including only 0 are adjacent to each other, as the second boundary position information an integer value indicative of the second position;

a third unit which is configured to detect, when the string of unit bits at the most significant bit side comprises a string of unit bits comprising 0 and 1, as the first boundary position information is an integer 0; and a fourth unit which is configured to detect, when the string of unit bits at the most significant bit side comprises a string of unit bits comprising 0 and 1, as the second boundary position information a value obtained by subtracting 1 from the number of the strings of the unit bits that the component has.

20. An identification information embedding apparatus, comprising:

a code generator which is configured to generate a collusion-secure code corresponding to identification information of an object, a restriction being provided between a maximum number of colluders defined by a tracing algorithm, the number of components forming the code, and a settable range of the identification information; and an embedding circuit which is configured to embed the generated code in the object, wherein c is the maximum number, d is the number of components forming the code, $p_0, p_1, \ldots p_{d-1}$ are relatively prime integers (where $0<p_0<p_1< \ldots <p_{d-1}$), V mod $p_{i-1}$ is an integer value which determines a boundary position at which a pattern of a bit string in an i-th component relative to identification information V varies, and a range of the identification information are integers which fall within a range from 0 to $p_0 \times p_1 \times \ldots \times p_{k-1}-1$), the restriction between d, c and k is represented by $d>(c^2/2) \cdot (k-1)$.

21. The apparatus according to claim 20, wherein the object comprises a chemical material product, and a component is changed to insert the code into the object.

22. An identification information embedding apparatus, comprising:

a code generator which is configured to generate a collusion-secure code corresponding to identification information of an object, a restriction being provided between a maximum number of colluders defined by a tracing algorithm, the number of components forming the code, and a settable range of the identification information; and an embedding circuit which is configured to embed the generated code in the object, wherein an i-th component of the code comprises a bit string including continuous 1 or 0 having a predetermined bit number, and the code comprises a string of unit bits obtained by concatenating a string of unit bits including only 1 whose number is the same as the integer value V mod $p_{i-1}$ from a high-order bit side and subsequently concatenating a string of unit bits including only 0 whose number is the same as a value obtained by subtracting 1 and the integer value V mod $p_{i-1}$ from the integer value $p_{i-1}$.

23. The apparatus according to claim 12, wherein the object comprises a chemical material product, and a component is changed to insert the code into the object.

* * * * *